United States Patent
Kong et al.

(10) Patent No.: US 12,456,532 B2
(45) Date of Patent: Oct. 28, 2025

(54) EFUSE OTP MEMORY DEVICE INCLUDING SERIAL INTERFACE LOGIC AND OPERATION METHOD THEREOF

(71) Applicant: SK keyfoundry Inc., Cheongju-si (KR)

(72) Inventors: Wan-Chul Kong, Gwangju-si (KR); Seongjun Park, Suwon-si (KR); Keesik Ahn, Hwaseong-si (KR)

(73) Assignee: SK keyfoundry Inc., Cheongju-si (KR)

( * ) Notice: Subject to any disclaimer, the term of this patent is extended or adjusted under 35 U.S.C. 154(b) by 273 days.

(21) Appl. No.: 17/977,221

(22) Filed: Oct. 31, 2022

(65) Prior Publication Data

US 2023/0307075 A1 Sep. 28, 2023

(30) Foreign Application Priority Data

Feb. 17, 2022 (KR) .......................... 10-2022-0020552

(51) Int. Cl.
*G11C 17/18* (2006.01)
*G11C 7/10* (2006.01)
*G11C 7/22* (2006.01)

(52) U.S. Cl.
CPC ............ *G11C 17/18* (2013.01); *G11C 7/1045* (2013.01); *G11C 7/222* (2013.01)

(58) Field of Classification Search
CPC ..................................................... G11C 17/18
See application file for complete search history.

(56) References Cited

U.S. PATENT DOCUMENTS

| | | | |
|---|---|---|---|
| 10,090,059 B2 | 10/2018 | Kim et al. | |
| 10,366,731 B2* | 7/2019 | Pekny | G06F 3/0619 |
| 2001/0015912 A1* | 8/2001 | Matsubara | H10B 41/40 |
| | | | 257/E27.081 |
| 2006/0084296 A1* | 4/2006 | Aizawa | G06K 19/07732 |
| | | | 439/79 |
| 2009/0161451 A1* | 6/2009 | Kim | G11C 5/143 |
| | | | 365/191 |
| 2010/0195396 A1* | 8/2010 | Higuchi | G11C 29/42 |
| | | | 365/201 |

(Continued)

FOREIGN PATENT DOCUMENTS

| | | |
|---|---|---|
| JP | 3-25607 A | 2/1991 |
| KR | 10-1999-0074710 A | 10/1999 |
| KR | 10-2017-0099668 A | 9/2017 |

OTHER PUBLICATIONS

Korean Office Action issued on Mar. 8, 2023, in counterpart Korean Patent Application No. 10-2022-0020552 (6 pages in Korean and 6 pages in English).

*Primary Examiner* — Douglas King
(74) *Attorney, Agent, or Firm* — NSIP Law

(57) ABSTRACT

An eFuse one-time programmable (OTP) memory includes an eFuse intellectual property (IP) configured to perform one-time writing and multiple readings for a plurality of memory cells, and a serial interface (SI) logic configured to receive a clock signal and a trim signal from a master device, and perform data writing to, or reading from, the eFuse IP based on the clock signal and the trim signal. The trim signal includes a start signal, a mode signal configured for a write mode or a read mode, and control signals configured to read or write for each of a plurality of addresses corresponding to the plurality of memory cells.

15 Claims, 21 Drawing Sheets

(56) References Cited

U.S. PATENT DOCUMENTS

| | | | |
|---|---|---|---|
| 2011/0264846 A1* | 10/2011 | Oh | G11C 7/1063 |
| | | | 711/E12.008 |
| 2013/0201745 A1* | 8/2013 | Chung | G11C 17/08 |
| | | | 365/96 |
| 2014/0211567 A1* | 7/2014 | Chung | G11C 16/10 |
| | | | 365/201 |
| 2015/0009743 A1* | 1/2015 | Chung | G11C 29/78 |
| | | | 365/96 |

\* cited by examiner

EFUSE OTP MEMORY DEVICE INCLUDING SERIAL INTERFACE LOGIC AND OPERATION METHOD THEREOF

CROSS-REFERENCE TO RELATED APPLICATIONS

This application claims the benefit under 35 USC § 119(a) of Korean Patent Application No. 10-2022-0020552, filed on Feb. 17, 2022, in the Korean Intellectual Property Office, the entire disclosure of which is incorporated herein by reference for all purposes.

BACKGROUND

1. Field

The following description relates to an OTP memory device, including a serial interface logic, and an operation method thereof.

2. Description of the Related Art

Non-volatile memory may be provided to embed a power management IC (PMIC) setting parameter. The PMIC often uses an eFuse one-time programmable (OTP) memory that does not require a separate additional process among various types of non-volatile memories.

The OTP memory is commonly designated as a memory that allows a data write operation only once and cannot additionally write data after the data write operation only once.

In general, to use the eFuse OTP memory, a customer who designs a custom IC must understand a very complex specification of the eFuse OTP memory.

However, as described above, when a customer directly designs a control circuit for the eFuse OTP memory, a problem may occur due to the insufficient review for the write/read function or defects in a design step.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an eFuse one-time programmable (OTP) memory includes an eFuse intellectual property (IP) configured to perform one-time writing and multiple readings for a plurality of memory cells, and a serial interface (SI) logic configured to receive a clock signal and a trim signal from a master device, and perform data writing to, or reading from, the eFuse IP based on the clock signal and the trim signal. The trim signal includes a start signal, a mode signal configured for a write mode or a read mode, and control signals configured to read or write for each of a plurality of addresses corresponding to the plurality of memory cells.

The serial interface logic may include a clock terminal configured to receive the clock signal from the master device, and a trim terminal configured to receive the trim signal from the master device. The serial interface logic may be further configured to determine the read or write based on the start signal received through the trim terminal, determine an operation mode of the eFuse OTP memory as the write mode or the read mode based on the mode signal through the trim terminal, and perform a read operation or a write operation for each of the plurality of addresses by receiving, through the trim terminal, the control signals.

When the operation mode of the eFuse OTP memory is determined as the read mode, the serial interface logic may be further configured to: determine whether to read from an n-th address based on a control signal for the n-th address among the control signals, when the read from the n-th address is determined, output a signal for the n-th address to the eFuse IP. The signal for the n-th address may have an n-th bit being 1 and other bits being 0.

The serial interface logic may be further configured to generate a main clock signal for the serial interface logic based on the received clock signal, and recognize the trim signal based on the main clock signal.

The serial interface logic may be further configured to generate a signal EN for enabling an output buffer of the eFuse IP, for the read from the n-th address, and a signal SAEN for enabling a sense amplifier of the eFuse IP. The signal EN may be output to the eFuse IP based on a first sub-clock signal obtained by delaying the main clock signal for as long as a first delay time. The signal SAEN may be output to the eFuse IP based on a second sub-clock signal obtained by delaying the main clock signal for as long as a second delay time.

When the operation mode of the eFuse OTP memory is determined as the write mode, the serial interface logic may be further configured to: determine whether to write to an n-th address based on a control signal for the n-th address among the control signals, when the write to the n-th address is determined, output a signal for the n-th address to the eFuse IP. The signal for the n-th address may have an n-th bit being 1 and other bits being 0.

The serial interface logic may further include a reset terminal configured to receive a reset signal from the master device. The serial interface logic may be further configured to receive a high-level start signal through the trim terminal after receiving a low-level reset signal through the reset terminal.

The trim signal may further include an end signal. The serial interface logic may be further configured to end the write mode or the read mode when the end signal is received through the trim terminal.

In another general aspect, an operation method of an eFuse one-time programmable (OTP) memory including a serial interface (SI) logic and an eFuse intellectual property (IP), the method includes detecting a read event or a write event based on a start signal received from a master device through a trim terminal, determining an operation mode of the eFuse OTP memory as a write mode or a read mode based on a mode signal received from the master device through the trim terminal, and performing a read operation or a write operation for each of a plurality of addresses based on control signals, received through the trim terminal, representing whether to read or write for each of the plurality of addresses corresponding to a plurality of memory cells.

When the operation mode of the eFuse OTP memory is determined as the read mode, the performing of the read operation or the write operation for each of the plurality of addresses may include receiving a control signal for an n-th address among the control signals, determining whether to read for the n-th address based on the control signal for the n-th address, and outputting a signal for the n-th address to the eFuse IP when the read from the n-th address is determined. The signal for the n-th address may have an n-th bit being 1 and other bits being 0.

The operation method may further include receiving a clock signal from the master device through a clock terminal; generating a main clock signal based on the received clock signal; and recognizing a trim signal based on the main clock signal.

The operation method may further include, when the read from the n-th address is determined, generating a signal EN for enabling an output buffer of the eFuse IP and a signal SAEN for enabling a sense amplifier of the eFuse IP. The signal EN may be output to the eFuse IP based on a first sub-clock signal obtained by delaying the main clock signal for as long as a first delay time. The signal SAEN may be output to the eFuse IP based on a second sub-clock signal obtained by delaying the main clock signal for as long as a second delay time.

When the operation mode of the eFuse OTP memory is determined as the write mode, the performing the read operation or the write operation for each of the plurality of addresses may include: receiving a control signal for an n-th address among the control signals; determining whether to write for the n-th address based on the control signal for the n-th address; and outputting a signal for the n-th address to the eFuse IP when the write to the n-th address is determined. The signal for the n-th address my have an n-th bit being 1 and other bits being 0.

The operation method may further include receiving a reset signal from the master device through a reset terminal. The start signal may be received after the low-level reset signal is received through the reset terminal.

The operation method may further include ending the write mode or the read mode when an end signal from the master device is received through the trim terminal.

In another general aspect, a system includes an eFuse one-time programmable (OTP) memory. The system includes a master device configured to output a clock signal and a trim signal through a serial interface communication, and the eFuse OTP memory configured to receive the clock signal and the trim signal from the master device through the serial interface communication, and perform data writing to, or reading from, an eFuse intellectual property (IP) based on the clock signal and the trim signal. The trim signal includes a start signal, a mode signal configured for a write mode or a read mode, and control signals configured to read or write for each of a plurality of addresses corresponding to a plurality of memory cells comprised in the eFuse IP.

The eFuse OTP memory may include a clock terminal configured to receive the clock signal from the master device, and a trim terminal configured to receive the trim signal from the master device. The eFuse OTP memory may be further configured to detect a read event or a write event based on the start signal received from the master device through the trim terminal, determine an operation mode of the eFuse OTP memory as the write mode or the read mode by receiving the mode signal from the master device through the trim terminal, and perform a read operation or a write operation for each of the plurality of addresses by receiving the control signals to each of the plurality of addresses through the trim terminal.

When the operation mode of the eFuse OTP memory is determined as the read mode, the eFuse OTP memory may be further configured to: determine whether to read from an n-th address based on a control signal for the n-th address among the control signals, when the read from the n-th address is determined, output a signal for the n-th address to the eFuse IP. The signal for the n-th address may have an n-th bit being 1 and other bits being 0.

When the operation mode of the eFuse OTP memory is determined as the write mode, the eFuse OTP memory may be further configured to: determine whether to write to an n-th address based on the control signal for the n-th address, when the write to the n-th address is determined, output a signal for the n-th address to the eFuse IP. The signal for the n-th address may have an n-th bit being 1 and other bits being 0.

Other features and aspects will be apparent from the following detailed description, the drawings, and the claims.

BRIEF DESCRIPTION OF THE DRAWINGS

Throughout the drawings and the detailed description, the same reference numerals refer to the same or like elements.

Figure 1:
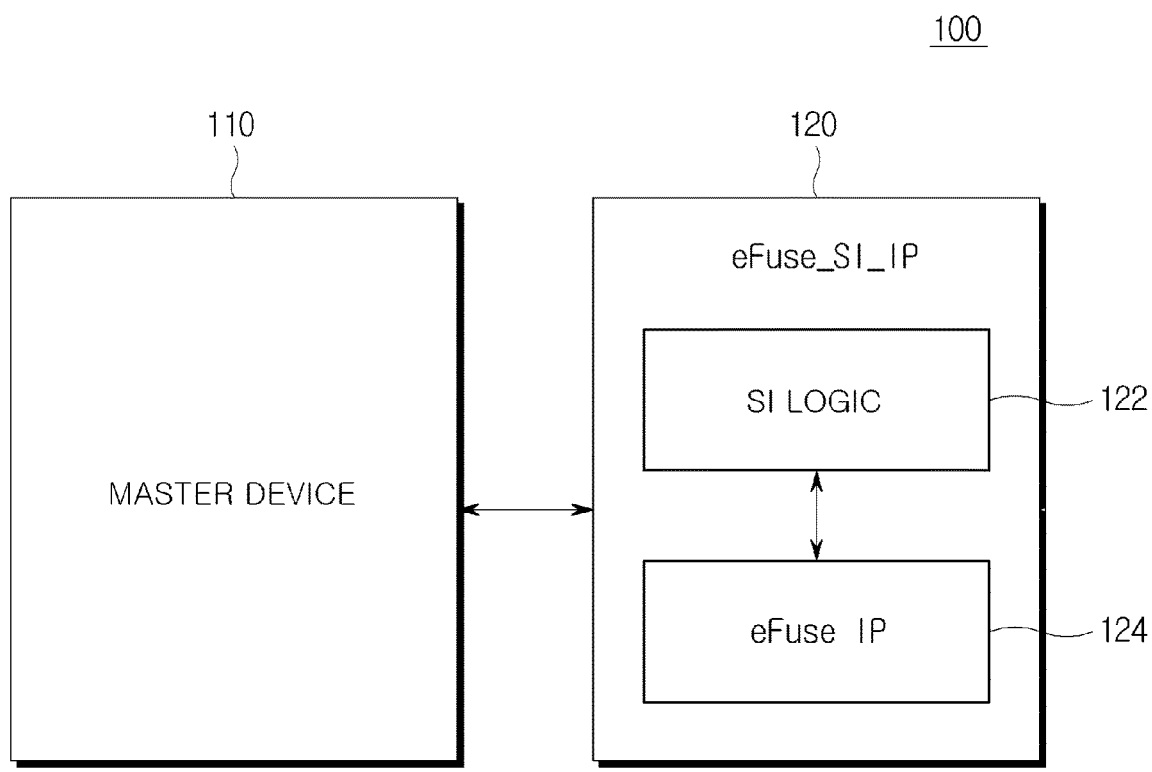
FIG. 1 shows a structure of a system, including an eFuse one-time programmable (OTP) memory according to one or more embodiments of the present disclosure.

The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A term "part" or "module" used in the embodiments may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

FIG. 1 shows a structure of a system 100, including an eFuse one-time programmable (OTP) memory according to one or more embodiments of the present disclosure. Hereinafter, at least one component of FIG. 1 will be described in detail with reference to FIGS. 2, 3, 4, 5A, and 5B. In one or more of the following embodiments, the eFuse OTP memory, including the serial interface logic may be referred to as eFuse_serial interface_intellectual property (eFuse_SI_IP).

Referring to FIG. 1, the system 100, including the eFuse one-time programmable memory, may include a master device 110 and an eFuse_SI_IP 120.

According to one or more embodiments, the master device 110 may transmit a control signal for reading data or writing data to the eFuse_SI_IP 120 through a serial interface. The master device 110 may be, for example, an application processor (AP) or a chip including a micro controller unit (MCU). The master device 110 writes data to (or programs in) at least one cell included in the eFuse_SI_IP 120 or transmits the control signal for reading data written to at least one cell to the eFuse_SI_IP 120 through the serial interface. According to an embodiment, the control signal for reading data or writing data may include at least one of a reset signal, a trim signal, and a clock signal.

According to one or more embodiments, the eFuse_SI_IP 120 may receive the control signal from the master device 110 through the serial interface, and may write or read data to or from eFuse IP 124 based on the received control signal. The eFuse_SI_IP 120 may be, for example, a slave chip controlled by the master device 110 through the serial interface.

According to one or more embodiments, the eFuse_SI_IP 120 may include a serial interface logic 122 and the eFuse IP 124.

Based on the control signal received from the master device 110, the serial interface logic 122 may output, to the eFuse IP 124, a write mode related control signal for writing data to a specific address of the eFuse IP 124 or may output, to the eFuse IP 124, a read mode related control signal for reading data written to a specific address of the eFuse IP 124.

The eFuse IP 124 may write data to or read data from an n-bit memory having n addresses in accordance with the write mode-related control signal or the read mode-related control signal provided from the serial interface logic 122. In the embodiments described below, a case in which the eFuse IP 124 includes a 16-bit memory will be described as an example. However, this is only an example for better understanding, and one or more embodiments of the present disclosure are not limited to the 16-bit memory.

Figure 2:
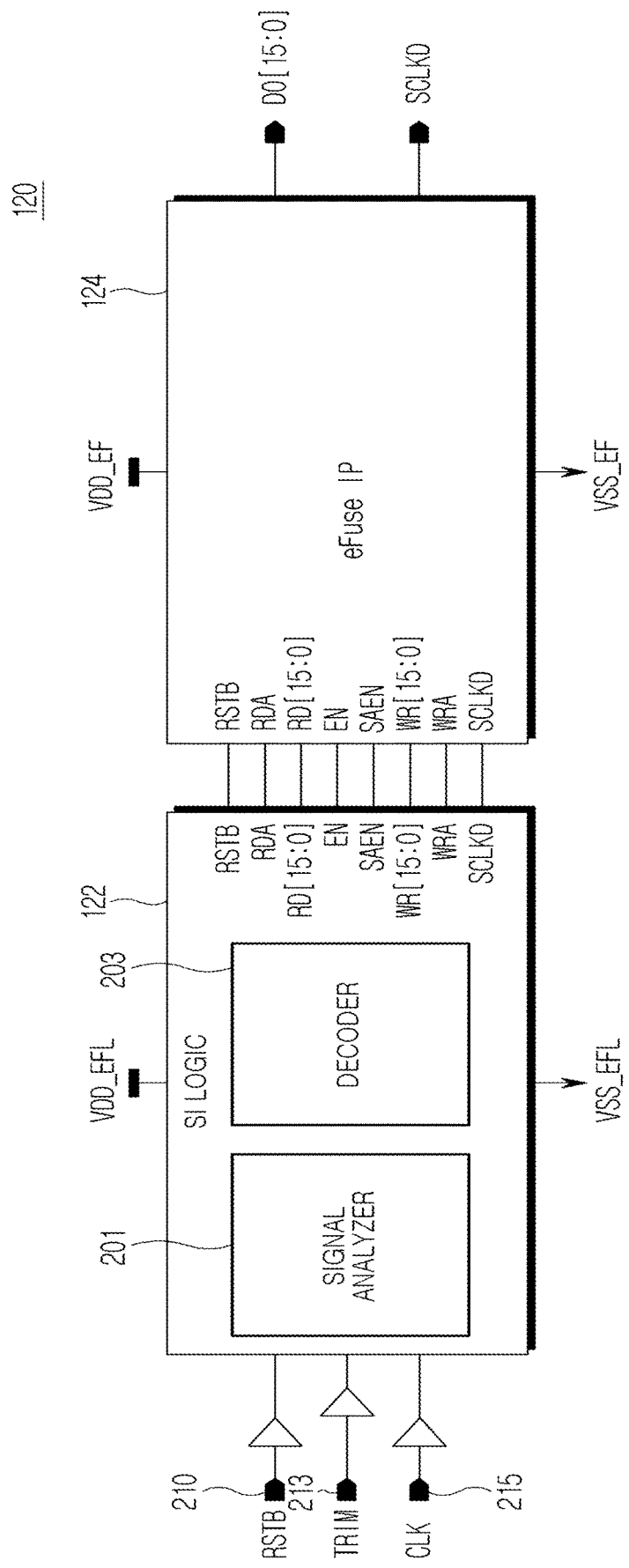
FIG. 2 shows a detailed structure of the eFuse OTP memory, including a serial interface logic according to one or more embodiments of the present disclosure.

According to one or more embodiments, the eFuse_SI_IP 120 may be configured as shown in FIG. 2.

FIG. 2 shows a detailed structure of the eFuse OTP memory, including a serial interface (SI) logic according to one or more embodiments of the present disclosure.

Referring to FIG. 2, the eFuse_SI_IP 120 may include a reset terminal 210, a trim terminal 213, and a clock terminal 215 to communicate with the master device 110 through the serial interface, and may include an output terminal DO [15:0] for outputting data stored in the memory cell. Additionally, the eFuse_SI_IP 120 may further include an output clock terminal SCLKD for outputting the clock signal used to generate an output signal.

In addition, between the serial interface logic 122 of the eFuse_SI_IP 120 and the eFuse IP 124, a reset signal RSTB, RDA, RD [15:0], EN, SAEN, WR [15:0], WRA, and SCLKD signals which are for controlling the eFuse IP 124 may be connected to each other.

The serial interface logic 122 may include a signal analyzer 201 and a decoder 203. The serial interface logic 122 may include the reset terminal 210, the trim terminal 213, and/or the clock terminal 215 in order to communicate with the master device 110 through the serial interface. The reset terminal 210 may receive a low-level reset signal RSTB from the master device 110, and the trim terminal 213 may receive the trim signal TRIM from the master device 110. The trim signal may include a data signal; therefore, the trim terminal may be referred to as a data terminal. The clock terminal 215 may receive the clock signal CLK from the master device 110.

According to one or more embodiments, the serial interface logic 122 may analyze a signal which is received through the reset terminal 210, the trim terminal 213, and/or the clock terminal 215 by using the signal analyzer 201, and may generate the write mode related control signals WR [15:0] and WRA or the read mode related control signals RDA, RD [15:0], EN, and SAEN through the decoder 203 based on the analysis result, and then may output the generated write mode related control signals or the generated read mode related control signals to the eFuse IP 124. Additionally, the serial interface logic 122 may directly transmit the reset signal received into the reset terminal 210 to the eFuse IP 124 and may transmit the clock signal SCLKD obtained by delaying the clock signal received into the clock terminal 215 to the eFuse IP 124.

According to an embodiment, the write mode-related control signal may include the signal WR [15:0] representing an address at which a write operation is to be performed, and may further include the WRA signal representing that the signal WR is a valid signal. The signal WR [15:0] may be composed of 16 bits to represent an address of each of the 16 memory cells included in the 16-bit memory. For example, bits of the signal WR [15:0] may have a one-to-one correspondence with 16 memory cells. For example, a first bit WR [0] of the signal WR may be matched to a first memory cell corresponding to a first address among 16 memory cells, and a third bit WR [2] of the signal WR may be matched to a third memory cell corresponding to a third address among 16 memory cells. Accordingly, a value of each bit of the signal WR [15:0] may represent whether to write to the memory cell corresponding to each address. For example, when the first bit of the signal WR [15:0] is 0 (or a low level), it may represent that writing to the first memory cell corresponding to the first address is not performed, and when the second bit is 1 (or a high level), it may represent that writing to the second memory cell corresponding to the second address should be performed.

According to an embodiment, the read mode-related control signal may include at least one of the signal RD [15:0] representing an address at which a read operation is to be performed, the signal EN for controlling an output buffer of the eFuse IP 124 during the read operation, or the signal SAEN for controlling a sense amplifier of the eFuse IP 124. Also, the read mode-related control signal may further include the RDA signal representing that the signal RD [15:0] is valid. The signal RD [15:0] may be composed of 16 bits to represent the address of each of the 16 memory cells included in the 16-bit memory. For example, bits of the signal RD [15:0] may have a one-to-one correspondence with the addresses of 16 memory cells. For example, a second bit RD [1] of the signal RD may be matched to a second memory cell corresponding to a second address among 16 memory cells, and a fifth bit RD [4] of the signal RD may be matched to a fifth memory cell corresponding to a fifth address among 16 memory cells. Accordingly, a value of each bit of the signal RD [15:0] may represent whether to read from the memory cell corresponding to each address. For example, when the first bit RD [0] of the signal RD is 0 (or a low level), it may represent that reading from the first memory cell corresponding to the first address is not performed, and when the second bit RD [1] is 1 (or a high level), it may represent that reading from the second memory cell corresponding to the second address should be performed.

According to one or more embodiments, the signal analyzer 201 may analyze a signal received through the reset terminal 210, the trim terminal 213, and/or the clock terminal 215. For example, according to an embodiment, the signal analyzer 201 detects a low-level reset signal through the reset terminal 210. When a specified reset period elapses, the signal analyzer 201 may receive the trim signal TRIM and the clock signal CLK through the trim terminal 213 and the clock terminal 215.

Figure 3:
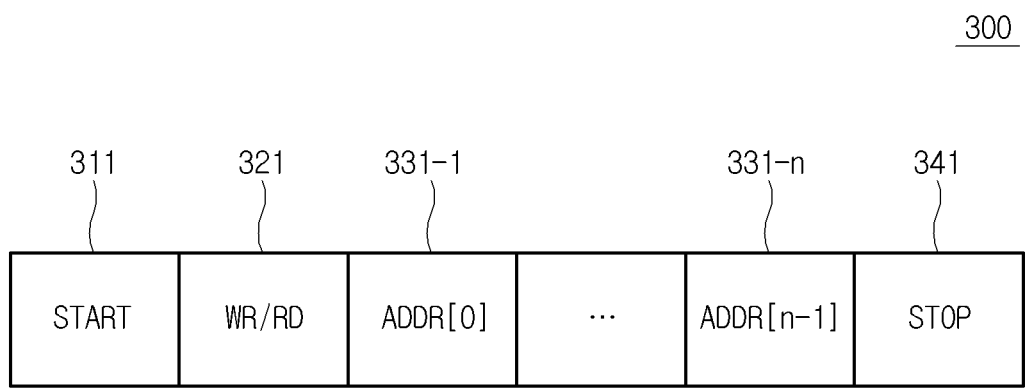
FIG. 3 shows a structure of a trim signal according to one or more embodiments of the present disclosure.

FIG. 3 shows a structure of a trim signal TRIM according to one or more embodiments of the present disclosure.

According to an embodiment, the signal analyzer 201 may receive the trim signal 300, having a structure shown in FIG. 3 from the master device 110 through the trim terminal 213. For example, the trim signal 300 may include a start signal START 311 representing whether to start writing or reading, a mode signal WR/RD 321 representing any one of the write mode or the read mode, trim signals (ADDR [0] _TRM 331-1, . . . , ADDR [n−1] _TRM 331-n) for n addresses, and an end signal STOP 341 representing whether the write mode or the read mode is ended. Here, the signals of FIG. 3 may be sequentially received, respectively. For example, the mode signal 321 may be received after the start signal 311 is first received, and then the trim signals (ADDR [0] _TRM 331-1, . . . , ADDR [n−1] _TRM 331-n) for each of n addresses may be received, and finally, the end signal 341 may be received. Here, the trim signals (ADDR [0] _TRM 331-1, . . . , ADDR [n−1] _TRM 331-n) for each of n addresses may also be sequentially received. For example, the trim signal ADDR [0] _TRM 331-1 for the first address may be first received through the trim terminal, and then the trim signal ADDR [1] _TRM for the second address may be received, and finally, the trim signal ADDR [n−1] _TRM for the n-th address may be received. Alternatively, the trim signal ADDR [n−1] _TRM for the n-th address may be first received, and then the trim signal ADDR [n−2] _TRM for the (n−1)-th address may be received, and finally, the trim signal ADDR [0] _TRM 331-1 for the first address may be received. According to an embodiment, a length of a time interval of each signal of FIG. 3 may be set to be the same. For example, the length of the time interval of the start signal 311, the length of the time interval of the mode signal 321, and the length of the time interval of each of the trim signals (ADDR [0] _TRM 331-1, . . . , ADDR [n−1] _TRM 331-n) for n addresses, and the length of the time interval of the end signal 341 may all be the same. For example, the time interval of each signal of FIG. 3 may be set to a time interval in which a clock pulse is repeated twice. For example, when the cycle of the clock signal is 10 us, the time interval of each signal of FIG. 3 may be determined as a time interval corresponding to 20 us. This is only an example, and one or more embodiments of the present disclosure are not limited thereto.

According to an embodiment, after the low-level reset signal RSTB is detected for a specified reset period, the signal analyzer 201 may detect whether the start signal 311 is received through the trim terminal 213, and may determine whether an event for reading or writing occurs. The start signal 311 may be, for example, a high-level signal. This is only an example, and the embodiments of the present disclosure are not limited thereto. For example, according to a design method, the start signal 311 may be a low-level trim signal. When the high-level start signal 311 is received through the trim terminal 213 after the low-level reset signal is detected through the reset terminal 210, the signal analyzer 201 may determine that an event for reading or writing has occurred. That is, when the high-level signal is received through the trim terminal after the reset signal is received through the reset terminal, the signal analyzer 201 may recognize the high-level signal as the start signal 311 and may determine the event for reading or writing has occurred.

According to an embodiment, when it is determined that the event for reading or writing has occurred (when the start signal 311 is detected), the signal analyzer 201 may analyze the mode signal 321, which is received after the start signal 311 through the trim terminal 213 and may determine in which mode the eFuse_SI_IP 120 should be operated among the read mode and the write mode. For example, when the level of the mode signal 321 received through the trim terminal 213 is a high level, the signal analyzer 201 may determine the operation mode of the eFuse_SI_IP 120 as the read mode (RD mode). For another example, when the level of the mode signal 321 received through the trim terminal 213 is a low level, the signal analyzer 201 may determine the operation mode of the eFuse_SI_IP 120 as the write mode (WR mode). This is only an example, and one or more embodiments of the present disclosure are not limited thereto. For example, when the level of the mode signal 321 is a low level, the signal analyzer 201 may determine the operation mode of the eFuse_SI_IP 120 as the read mode, and when the level of the mode signal 321 is a high level, the signal analyzer 201 may determine the operation mode of the eFuse_SI_IP 120 as the write mode. According to an embodiment, the signal analyzer 201 may generate a mode signal corresponding to the determined mode. For example, when it is determined that the read mode should be performed based on the mode signal 321, the signal analyzer 201 may generate a high-level read mode (RM) signal representing the read mode. For another example, when it is determined that the write mode should be performed based on the mode signal 321, the signal analyzer 201 may generate a high-level write mode (WM) signal representing the write mode. Here, the read mode (RM) signal and/or the write mode (WM) signal are used within the serial interface logic 122 and will not be output to the eFuse IP 124.

According to an embodiment, when a mode to be performed among the read mode or the write mode is determined through the mode signal 321, the signal analyzer 201 may analyze the trim signals (ADDR [0] _TRM 331-1, . . . , ADDR [n−1] _TRM 331-n) for each of n addresses received next through the trim terminal 213. The signal analyzer 201 may determine whether to read or write for each of n-bit memory cells, based on the trim signals (ADDR [0] _TRM 331-1, . . . , ADDR [n−1] _TRM 331-n) for each of n addresses. The signal analyzer 201 may control the memory cell determined to be read or written to be read or written, based on a one-hot encoding method.

According to an embodiment, each of the trim signals (ADDR [0] _TRM 331-1, . . . , ADDR [n−1] _TRM 331-n) for each of n addresses may represent whether the read operation from the corresponding address or the write operation to the corresponding address is performed.

For example, in the read mode, when the trim signal ADDR [0] _TRM to the first address is at a high level, it may represent that the read operation from the first memory cell should be performed. When the trim signal ADDR [1] _TRM to the second address is at a low level, it may represent that the read operation from the second memory cell is not performed. When the trim signal ADDR [n−1] _TRM to the n-th address is at a high level, it may represent that the read operation from the (n−1)-th memory cell should be performed.

For another example, in the write mode, when the trim signal ADDR [0] _TRM to the first address is at a high level, it may represent that the write operation to the first memory cell should be performed. When the trim signal ADDR [1] _TRM to the second address is at a low level, it may represent that the write operation to the second memory cell is not performed. When the trim signal ADDR [n−1] _TRM to the n-th address is at a high level, it may represent that the write operation to the n-th memory cell should be performed.

According to an embodiment, the decoder 203 may generate and output the write mode-related control signal or the read mode-related control signal based on the information analyzed and determined by the signal analyzer 201. For example, in the write mode, the decoder 203 may generate the signal WR [15:0] and output the generated signal WR to the eFuse IP 124. For another example, in the read mode, the decoder 203 may generate the signal RD [15:0], the signal EN, and the signal SAEN and may output them to the eFuse IP 124.

Figure 4:
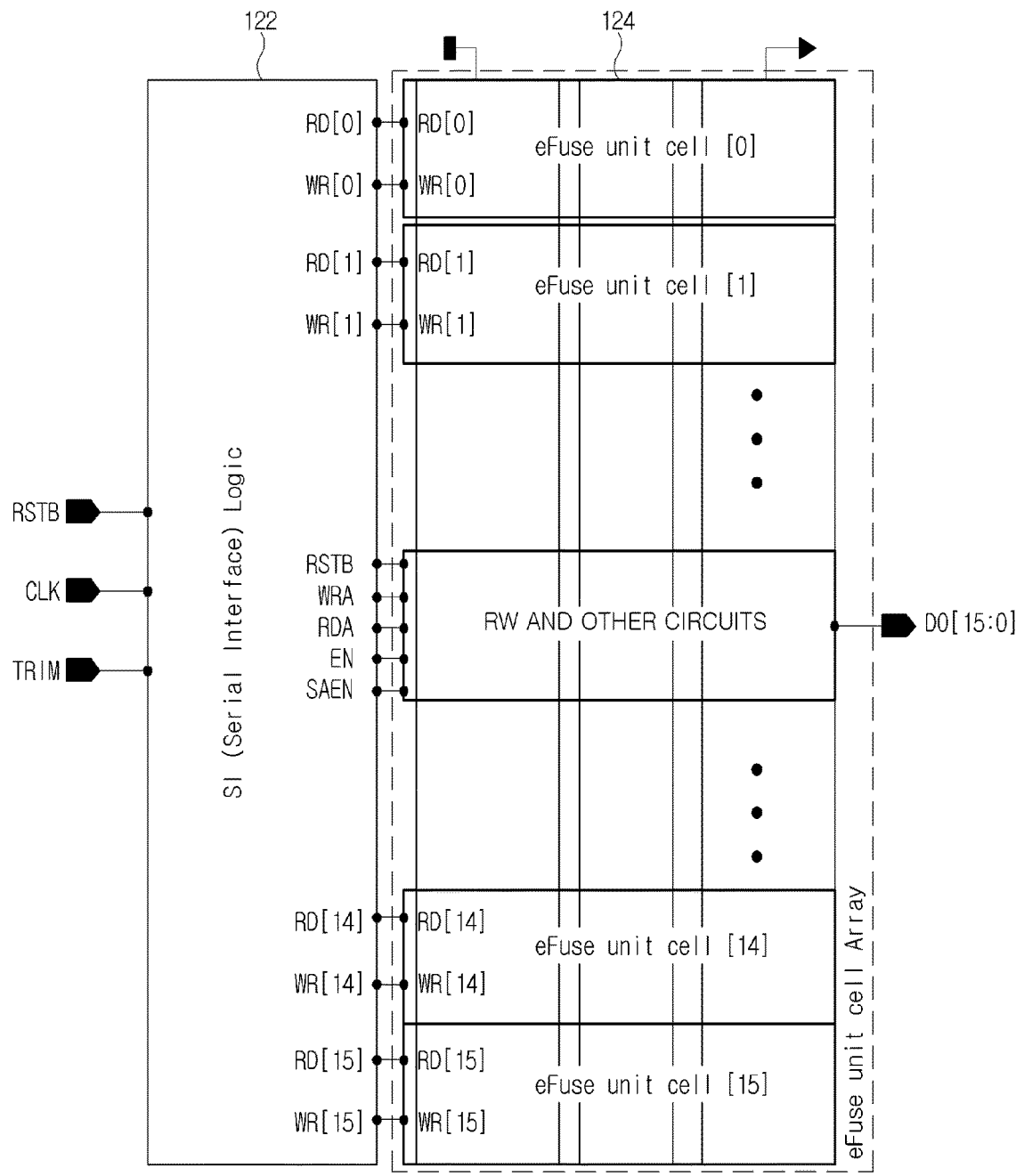
FIG. 4 shows a connection structure between the serial interface logic and memory cells within eFuse IP according to one or more embodiments of the present disclosure.

FIG. 4 shows a connection structure between the serial interface logic and memory cells within eFuse IP according to one or more embodiments of the present disclosure.

According to an embodiment, the serial interface logic 122 and the eFuse IP 124 are connected, as shown in FIG. 4, so that they may transmit and receive the signal WR [15:0] and the signal RD [15:0]. For example, the serial interface logic 122 may include 16 WR output terminals WR [0], WR [1], ..., WR [14], and WR for outputting the signal WR [15:0], and may include 16 RD output terminals RD [0], RD [1], ..., RD, and RD for outputting the signal RD [15:0]. The WR output terminals of the serial interface logic 122 may be connected one-to-one to WR input terminals WR [0], WR [1], ..., WR [14], and WR provided respectively in the memory cells (efuse unit cell [0], efuse unit cell [1], ..., efuse unit cell [14], and efuse unit cell [15]) included in the eFuse IP 124. The RD output terminals of the serial interface logic 122 may be connected one-to-one to RD input terminals RD [0], RD [1], ..., RD [14], and RD provided respectively in the memory cells (efuse unit cell [0], efuse unit cell [1], ..., efuse unit cell [14], and efuse unit cell [15]) included in the eFuse IP 124.

Accordingly, the serial interface logic 122 may output a high-level signal through the WR output terminal connected to a memory cell in which data writing is to be performed among a plurality of memory cells of the eFuse IP 124, and may output a low-level signal through the WR output terminal connected to the other memory cells. Accordingly, the data writing is performed to a memory cell that has received the high-level signal among the memory cells of the eFuse IP 124, and other memory cells may maintain their initial state. For example, the serial interface logic 122 may output a high-level signal through the terminal WR [0] in order to write data to the first memory cell (eFuse unit cell [0]) of the eFuse IP 124, and may output a low-level signal through the other terminals WR [1], ..., WR [14], and WR [15]. In this case, the write operation is performed to the first memory cell (eFuse unit cell [0]) of the eFuse IP 124, and the other memory cells (efuse unit cell [1], ..., efuse unit cell [14], and efuse unit cell [15]) will maintain the initial state.

In addition, the serial interface logic 122 may output a high-level signal to the RD output terminal connected to a memory cell to be read among the plurality of memory cells of the eFuse IP 124, and may output a low-level signal to the RD output terminal connected to the other memory cells. Accordingly, a memory cell that has received the high-level signal among the memory cells of the eFuse IP 124 may be read, and other memory cells may not be read. For example, the serial interface logic 122 may output a high-level signal through the terminal RD [0] in order to read data of the first memory cell (eFuse unit cell [0]) of the eFuse IP 124, and may output a low-level signal through the other terminals RD [1], ..., RD [14], and RD [15]. In this case, the data of the first memory cell (eFuse unit cell [0]) of the eFuse IP 124 is read, and the data of the other memory cells (efuse unit cell [1], ..., efuse unit cell [14], and efuse unit cell [15]) will not be read.

Figure 5A:
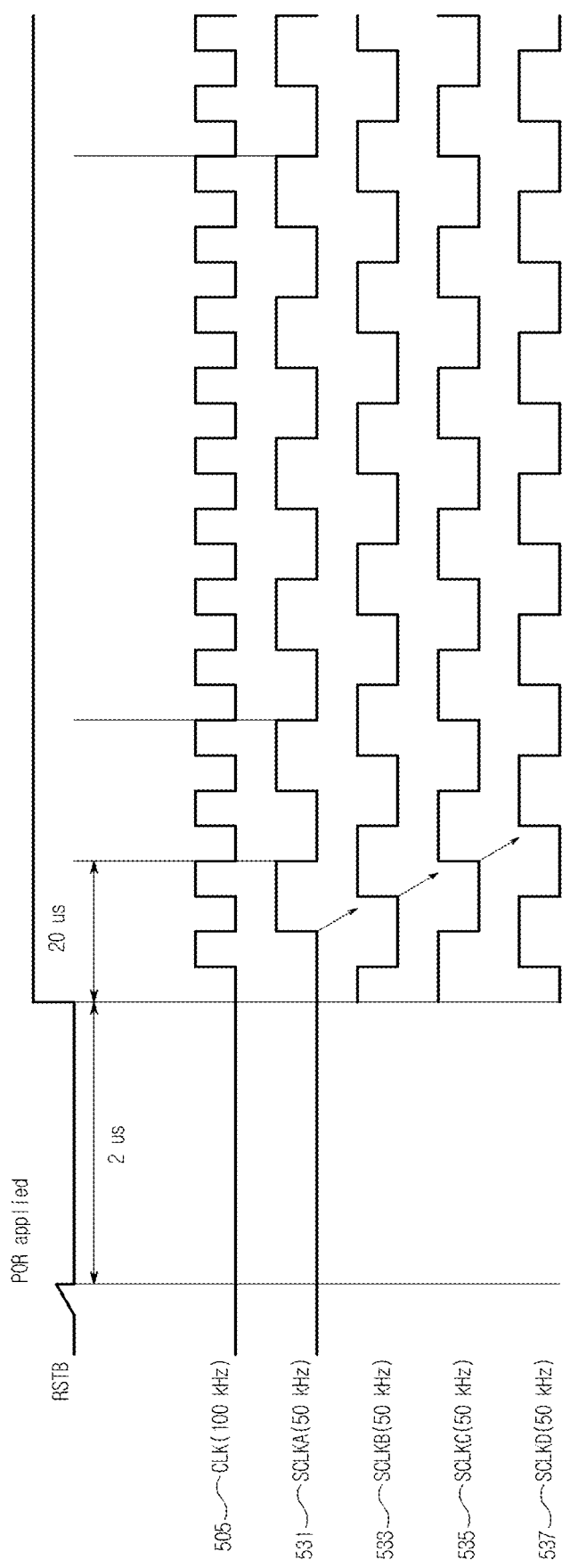
FIG. 5A shows clock signals within the serial interface logic according to one or more embodiments of the present disclosure.

FIG. 5A shows clock signals within the serial interface logic according to one or more embodiments of the present disclosure.

According to one or more embodiments, the serial interface logic 122 may generate internal clock signals for the eFuse_SI_IP 120, based on the clock signal received through the clock terminal. For example, as shown in FIG. 5A, based on a clock signal CLK 505 received through the clock terminal, the serial interface logic 122 may generate internal clock signals SCLKA 531, SCLKB 533, SCLKC 535, and SCLKD 537 to be used in the eFuse_SI_IP 120.

According to an embodiment, the serial interface logic 122 may divide the clock signal CLK 505 received through the clock terminal into two and then may generate a main clock signal SCLKA 531. Based on the main clock signal SCLKA 531, the serial interface logic 122 may identify a mode signal section and a start signal section of the trim signal, a trim signal section for each of n addresses, and an end signal section.

According to an embodiment, based on the main clock signal SCLKA 531, the serial interface logic 122 may generate sub-clock signals SCLKB 533, SCLKC 535, and SCLKD 537. For example, the serial interface logic 122 may generate the first sub-clock signal SCLKB 533 obtained by delaying the main clock signal for as long as a specified first delay time, the second sub-clock signal SCLKC 535 obtained by delaying the main clock signal for as long as a specified second delay time, and the third sub-clock signal SCLKD 537 obtained by delaying the main clock signal for as long as a specified third delay time. Here, the second delay time may be greater than the first delay time, and the third delay time may be greater than the second delay time. According to an embodiment, the first sub-clock signal SCLKB 533 may be used to control an output timing of the signal EN, and the second sub-clock signal SCLKC 535 may be used to control an output timing of the signal SAEN. For example, the signal EN may be output at the rising edge of the first sub-clock signal SCLKB 533, and the signal SAEN may be output at the rising edge of the second sub-clock signal SCLKC 535. According to an embodiment, the third sub-clock signal SCLKD 537 may be output to the eFuse IP 124 for the operation of the eFuse IP 124.

Figure 5B:
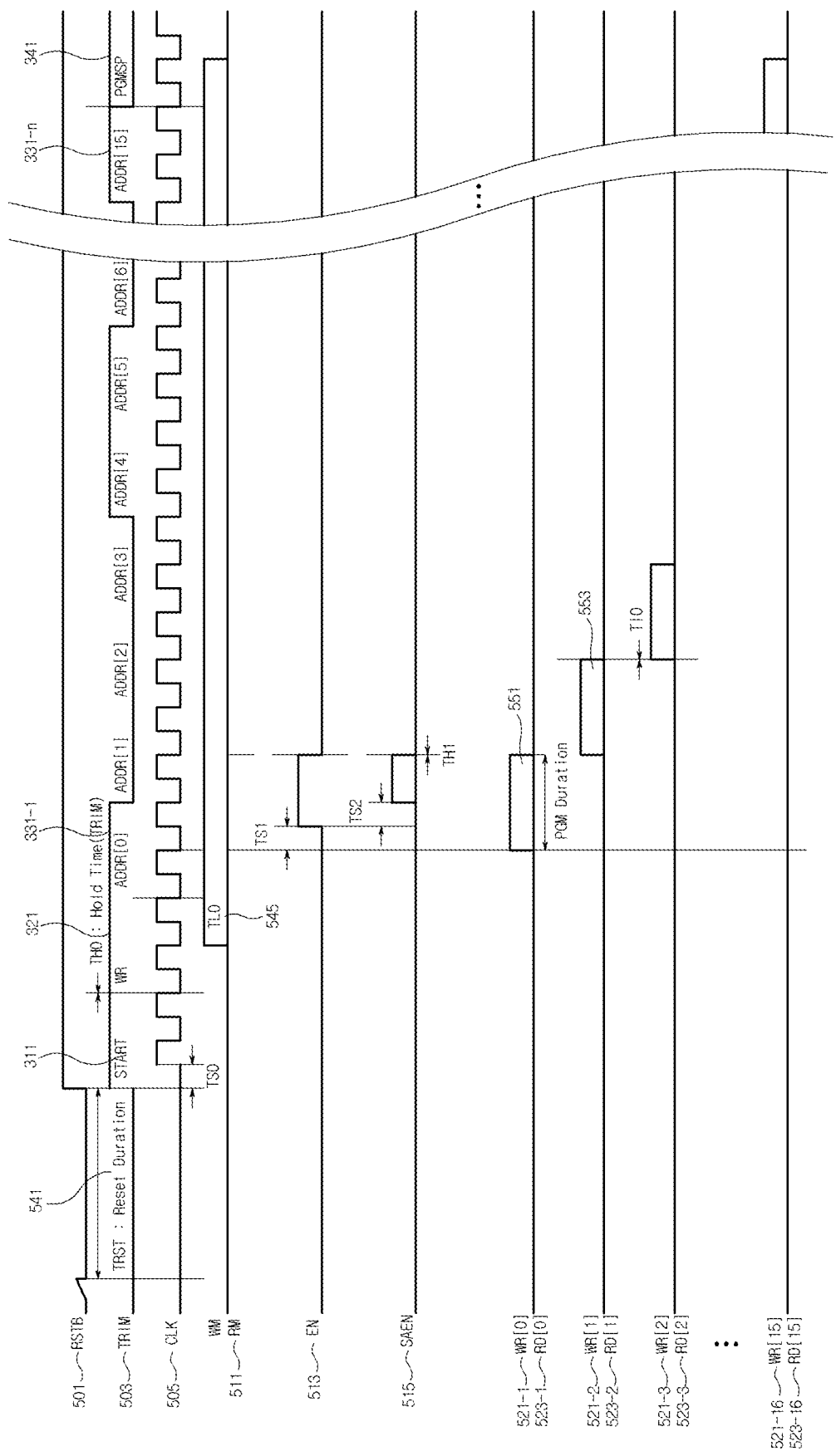
FIG. 5B is a timing diagram showing that read and write operations of the eFuse IP are controlled based on the trim signal and the clock signal, in the serial interface logic according to one or more embodiments of the present disclosure.

FIG. 5B is a timing diagram showing that read and write operations of the eFuse IP are controlled based on the trim signal and the clock signal, in the serial interface logic according to one or more embodiments of the present disclosure.

According to one or more embodiments, as shown in FIG. 5B, based on a signal received through the reset terminal, the trim terminal, and/or the clock terminal, the serial interface logic 122 may generate and output the write mode-related control signal or the read mode-related control signal.

Referring to FIG. 5B, the serial interface logic 122 may receive the low-level reset signal RSTB 501 through the reset terminal during a reset period TRST 541. The serial interface logic 122 may check through the trim terminal whether the trim signal 503 received with the lapse of the reset period is at a high level or a low level. In the case where the trim signal is at a low level, the serial interface logic 122 may determine that the read mode or the write mode is not started. In the case where the trim signal is at a high level, the serial interface logic 122 may determine that the read mode or the write mode is started by recognizing the trim signal as the start signal 311. Here, the serial interface logic 122 may divide the clock signal CLK 505 into two, and then may generate the main clock signal SCLKA 531.

When the start of the read mode or the write mode is determined, the serial interface logic 122 may determine whether a mode signal 313 received through the trim terminal is at a high level or a low level and then may determine the operation mode of the eFuse_SI_IP 120. When the mode signal 313 is at a high level, the serial interface logic 122 may determine the operation mode of the eFuse_SI_IP 120 as the read mode (RD mode), and when the mode signal 313 is at a low level, the serial interface logic 122 may determine the operation mode of the eFuse_SI_IP 120 as the write mode (WR mode). When the operation mode is determined, the serial interface logic 122 may generate a write mode signal or a read mode signal WM/RM 511 representing the determined operation mode. Here, the write mode signal or a read mode signal WM/RM 511 may be generated during a time period TLO 545, which is a time period in which write mode control or read mode control for the entire address area of the eFuse_SI_IP 120 is completed.

When the operation mode is determined, the serial interface logic 122 may check the trim signals (ADDR [0] _TRM 331-1, . . . , ADDR [n–1] _TRM 331-n for each of n addresses received through the trim terminal and may determine whether to write or read for each address.

First, a case in which the operation mode is determined as the write mode will be described.

According to an embodiment, when the trim signal ADDR [0] _TRM for the first address is at a high level in a state where the write mode signal WM has been generated, the serial interface logic 122 may determine the writing to the first address ADDR [0]. According to an embodiment, in order to write to the first address ADDR [0], the serial interface logic 122 may output a high-level signal 551 to the terminal WR [0] 521-1 at the rising edge of a main clock signal SCKLA and may output a low-level signal to the terminals WR [1], . . . , WR 521-2 to 521-16. After receiving the trim signal ADDR [0] _TRM for the first address through the trim terminal, the serial interface logic 122 may receive the trim signal ADDR [1] _TRM for the second address. When the trim signal ADDR [1] _TRM for the second address is at a high level, the serial interface logic 122 may determine to write to the second address ADDR [1], may output a high-level signal 553 to the terminal WR [1] 521-2 at the rising edge of the main clock signal SCKLA, and may output a low-level signal to and the terminals WR [0], WR [2], . . . , WR 521-1, 521-3 to 521-16. The serial interface logic 122 may repeat the above-described operation until the trim signals (ADDR [0] _TRM 331-1, . . . , ADDR [n–1] _TRM 331-n) for n addresses are all received through the trim terminal. For example, the serial interface logic 122 may use a one-hot encoding method of outputting 1 only to a memory cell to which the write operation is to be performed at a corresponding time point and of outputting 0 to the other memory cells.

Next, a case in which the operation mode is determined as the read mode will be described.

According to an embodiment, when the trim signal ADDR [0] _TRM for the first address is at a high level in a state in which the read mode signal RM has been generated, the serial interface logic 122 may determine the reading from the first address ADDR [0]. According to an embodiment, in order to read from the first address ADDR [0], the serial interface logic 122 may output the high-level signal 551 to a terminal RD [0] 523-1 at the rising edge of a main clock signal SCKLA and may output a low-level signal to the terminals RD [1], . . . , RD 523-1 to 523-16. Here, the serial interface logic 122 may output the signal EN 513 and the signal SAEN 515 to the eFuse IP 124. The signal EN 513 may be output at the rising edge of the first sub-clock signal SCLKB, and the signal SAEN 515 may be output at the rising edge of the second sub-clock signal SCLKC. The serial interface logic 122 may repeat the above-described operation until the trim signals (ADDR [0] _ TRM 331-1, . . . , ADDR [n–1] _TRM 331-n) for n number of addresses are all received through the trim terminal. For example, the serial interface logic 122 may use a one-hot encoding method of outputting 1 only to a memory cell to be read at a corresponding time point and of outputting 0 to the other memory cells.

According to an embodiment, after the trim signals (ADDR [0] _TRM 331-1, . . . , ADDR [n–1] _TRM 331-n) for n number of addresses are all received through the trim terminal, the serial interface logic 122 may receive the end signal for ending the read mode or the write mode. The end signal may be set to either a high level or a low level.

Hereinafter, with reference to FIGS. 5C and 5D will be an example where the serial interface logic 122 outputs a control signal to the eFuse IP 124 based on the trim signal and the clock signal.

Figure 5C:
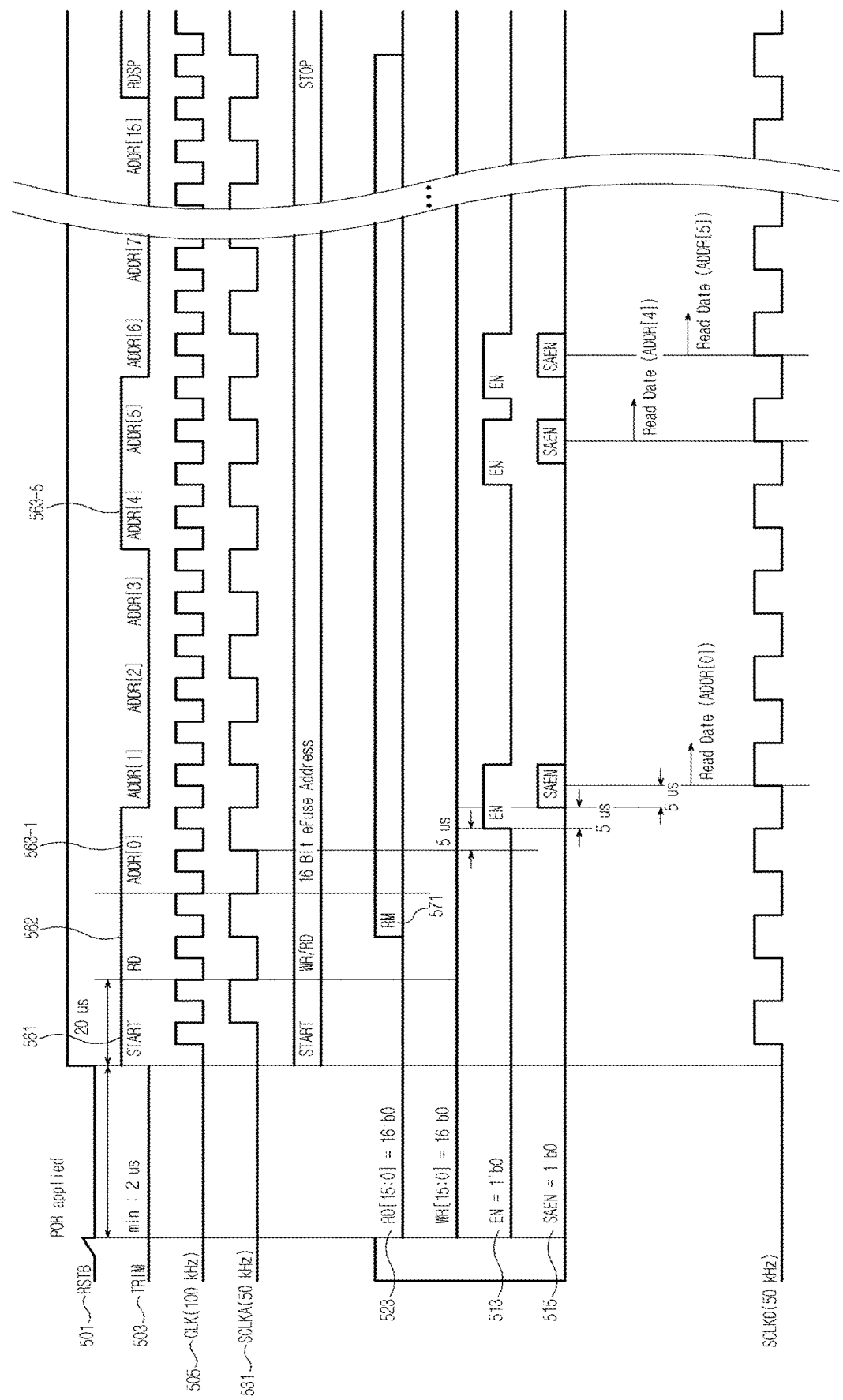
FIG. 5C shows an example of controlling the read operation of the eFuse IP based on the trim signal and the clock signal, in the serial interface logic according to one or more embodiments of the present disclosure.

FIG. 5C shows an example of controlling the read operation of the eFuse IP based on the trim signal and the clock signal, in the serial interface logic according to one or more embodiments of the present disclosure.

Referring to FIG. 5C, the serial interface logic 122 may receive the low-level reset signal RSTB 501 through the reset terminal and then may receive the trim signal 503 through the trim terminal. When a high-level start signal 561 is recognized from the received trim signal 503, the serial interface logic 122 may determine that the read mode or the write mode is started. Here, the serial interface logic 122 may divide the clock signal CLK 505 into two and may generate the main clock signal SCLKA 531, and then may recognize the trim signal based on this. This is only an example, and embodiments of the present disclosure are not limited thereto. That is, the clock signal 505 can be used as the main clock signal 531 without division, or the clock signal divided into four may be used as the main clock signal 531.

Then, when the serial interface logic 122 recognizes a high-level mode signal 562 from the signal received through the trim terminal, the serial interface logic 122 may determine the operation mode of the eFuse_SI_IP 120 as the read mode (RD mode). The serial interface logic 122 may generate a read mode signal RM 571, representing that the operation mode is the read mode. The read mode signal 571 may be used within the serial interface logic 122 without being output to the eFuse IP 124.

When the operation mode is determined as the read mode, the serial interface logic 122 may recognize the trim signals (ADDR [0] _TRM 331-1, . . . , ADDR [n–1] _TRM 331-n) for each of n number of addresses received through the trim terminal and may determine whether to read from each address. Here, it is assumed that the trim signals for ADDR [0], ADDR [4], and ADDR [5] are at a high level, and the trim signals for the other addresses are at a low level.

When the serial interface logic 122 recognizes that the trim signal ADDR [0] _TRM 563-1 for the first address is at a high level, the serial interface logic 122 may determine the reading from the first address ADDR [0], and may output a signal representing that the reading from the first address ADDR [0] is performed through the signal RD [15:0] 523. For example, in order to read from the first address ADDR [0], the serial interface logic 122 may output the signal RD [15:0] of "0000000000000001" at the rising edge of the main clock signal SCKLA 531 to the eFuse IP 124. Additionally, the serial interface logic 122 may output the signal EN 513 based on the first sub-clock signal SCLKB and may output the signal SAEN 515 based on the second sub-clock signal SCLKC to the eFuse IP 124. Then, the eFuse IP 124 may read data for the first address based on the third sub-clock signal SCLKD.

When the serial interface logic 122 recognizes that the trim signal ADDR [1] _TRM for the second address, the trim signal ADDR [2] _TRM for the third address, and the trim signal ADDR [3] _TRM for the fourth address are a low level, the reading from the corresponding addresses is not performed.

The serial interface logic 122 recognizes that the trim signal ADDR [4] _TRM 563-5 for the fifth address is at a high level, may determine to read from the fifth address ADDR [4], and may output a signal representing that the reading from the fifth address is performed through the signal RD [15:0] 523. For example, in order to read from the fifth address, the serial interface logic 122 may output the signal RD [15:0] of "0000000000010000" at the rising edge of the main clock signal SCKLA to the eFuse IP 124. Additionally, the serial interface logic 122 may output the signal EN 513 based on the first sub-clock signal SCLKB and may output the signal SAEN 515 based on the second sub-clock signal SCLKC to the eFuse IP 124. Then, the eFuse IP 124 may read data for the fifth address based on the third sub-clock signal SCLKD.

The serial interface logic 122 may operate in the same manner as described above depending on whether the trim signals ADDR [5] to ADDR for each of the sixth to fifteenth addresses are recognized as being at a high level or a low level.

The serial interface logic 122 may receive the end signal after receiving the trim signal ADDR for the sixteenth address.

Figure 5D:
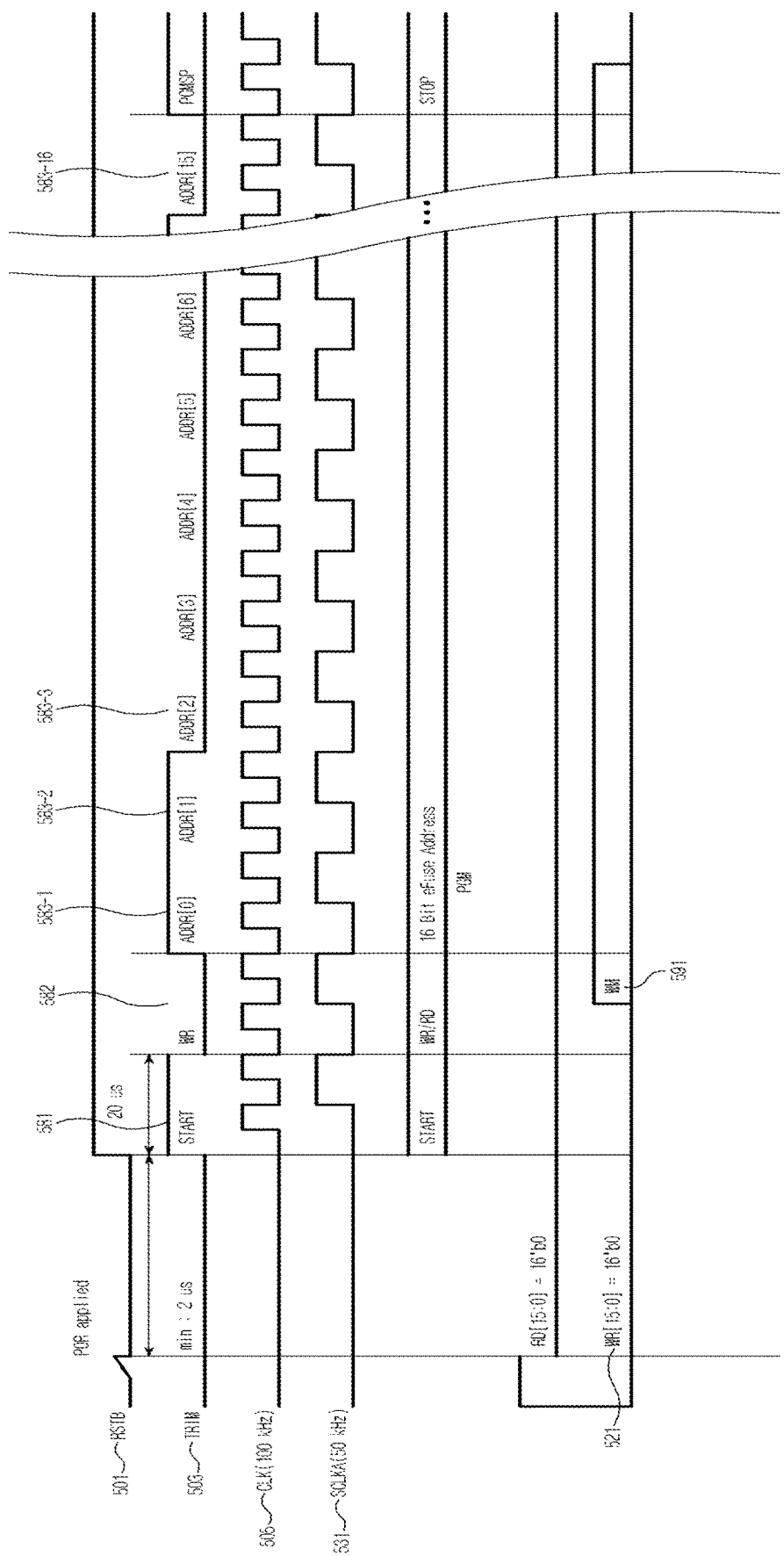
FIG. 5D shows an example of controlling the write operation of the eFuse IP based on the trim signal and the clock signal, in the serial interface logic according to one or more embodiments of the present disclosure.

FIG. 5D shows an example of controlling the write operation of the eFuse IP based on the trim signal and the clock signal, in the serial interface logic according to one or more embodiments of the present disclosure.

Referring to FIG. 5D, the serial interface logic 122 may receive the low-level reset signal RSTB 501 through the reset terminal and then may receive the trim signal 503 through the trim terminal. When a high-level start signal 581 is recognized from the received trim signal 503, the serial interface logic 122 may determine that the read mode or the write mode is started. Here, the serial interface logic 122 may divide the clock signal CLK 505 into two and may generate the main clock signal SCLKA 531, and then may recognize the trim signal based on this. This is only an example, and embodiments of the present disclosure are not limited thereto. That is, the clock signal 505 can be used as the main clock signal 531 without division, or the clock signal divided into four may be used as the main clock signal 531.

Then, when the serial interface logic 122 recognizes a high-level mode signal 582 from the signal received through the trim terminal, the serial interface logic 122 may determine the operation mode of the eFuse_SI_IP 120 as the write mode (WR mode). The serial interface logic 122 may generate a write mode signal RM 591, representing that the operation mode is the write mode. The write mode signal 591 may be used within the serial interface logic 122 without being output to the eFuse IP 124.

When the operation mode is determined as the write mode, the serial interface logic 122 may recognize the trim signals (ADDR [0] _TRM 583-1, . . . , ADDR [15] _TRM 583-16 for each of n number of addresses received through the trim terminal and may determine whether to write to each address. Here, it is assumed that the trim signals for ADDR [0], ADDR [1], ADDR [9], ADDR [11], ADDR [12], ADDR [13], and ADDR are at a high level, and the trim signals for the other addresses are at a low level.

When the serial interface logic 122 recognizes that the trim signal ADDR [0] _TRM 583-1 for the first address is at a high level, the serial interface logic 122 may determine to write to the first address ADDR [0], and may output a signal representing that the write operation to the first address ADDR [0] is performed through the signal WR [15:0] 521. For example, in order to write to the first address ADDR [0], the serial interface logic 122 may output the signal WR [15:0] of "0000000000000001" at the rising edge of the main clock signal SCKLA 531 to the eFuse IP 124.

When the serial interface logic 122 recognizes that the trim signal ADDR [1] _TRM 583-2 for the second address is also at a high level, the serial interface logic 122 may determine the write operation to the second address ADDR [1], and may output a signal representing that the write operation to the second address ADDR [1] is performed through the signal WR [15:0] 521. For example, in order to write to the second address ADDR [1], the serial interface logic 122 may output the signal WR [15:0] of "0000000000000010" at the rising edge of the main clock signal SCKLA 531 to the eFuse IP 124.

When the serial interface logic 122 recognizes that the trim signal ADDR [2] _TRM 583-3 for the third address is at a low level, the serial interface logic 122 does not perform the write operation to the third address ADDR [2]. Accordingly, in order not to perform the write operation to the third address ADDR [2], the serial interface logic 122 may output the signal WR [15:0] of "0000000000000000" at the rising edge of the main clock signal SCKLA 531 to the eFuse IP 124.

The serial interface logic 122 may operate in the same manner as described above, depending on whether the trim signals for the other addresses are recognized as being at a high level or a low level.

The serial interface logic 122 may receive the end signal after receiving the trim signal ADDR [15] _TRM for the sixteenth address.

Figure 6:
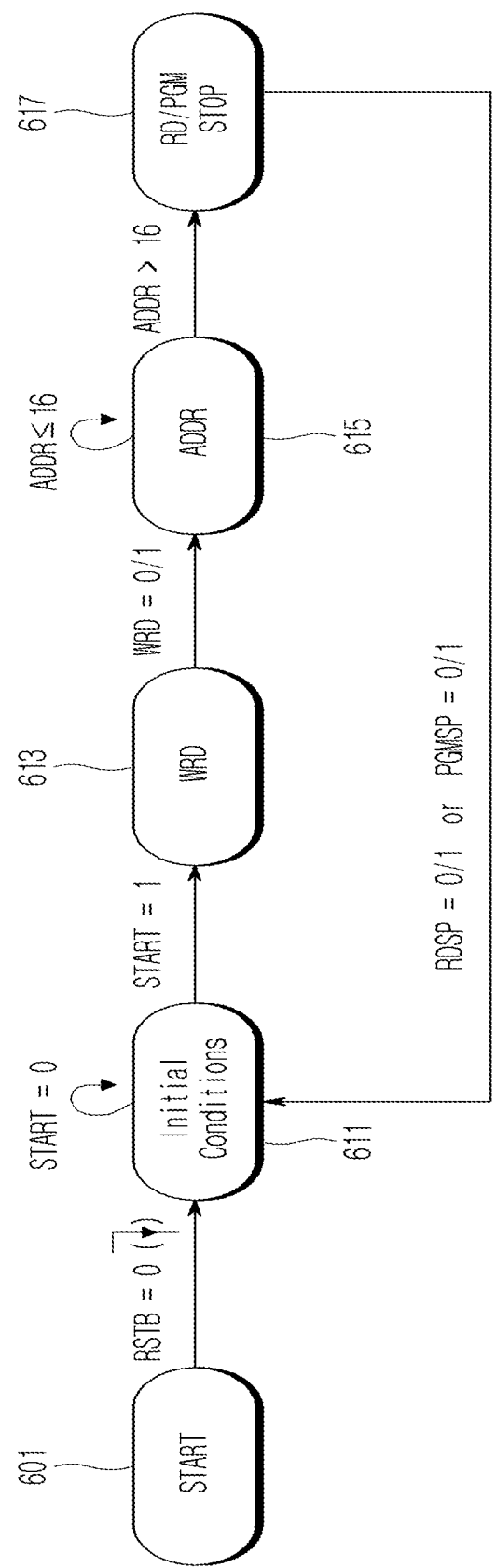
FIG. 6 is a state transition diagram according to the trim signal, in one or more embodiments of the present disclosure.

FIG. 6 is a state transition diagram according to the trim signal, in one or more embodiments of the present disclosure.

Referring to FIG. 6, the serial interface logic 122 may determine the operation state of the eFuse_SI_IP 120 based on a signal received through the reset terminal and the trim terminal. When a low-level reset signal RSTB is detected through the reset terminal in a start state START 601, the serial interface logic 122 transitions to an initial condition state 611 where an initial setting is performed. Here, the start state 601 may be an idle state where the serial interface logic 122 waits for the reset signal to be received through the reset terminal or receives the reset signal, and the initial condition state 611 may be a state where internal parameters are set to initial values in the serial interface logic 122.

When a low-level signal is received through the trim terminal, the serial interface logic 122 may maintain the initial condition state 611, and when a high-level start signal is recognized through the trim terminal, the serial interface logic 122 may transition to a WRD state 613. The WRD state 613 may be a state intended to allow the serial interface logic 122 to recognize the mode signal through the trim terminal.

When a mode signal is received through the trim terminal in the WRD state 613, the serial interface logic 122 may determine the operation mode of the eFuse_SI_IP 120 as the read mode (RD mode) or the write mode (WR mode), and may transition to an ADDR state 615. The ADDR state 615 may be a state where the serial interface logic 122 receives the trim signal for each address of the memory cells of the eFuse IP 124. The serial interface logic 122 may receive the trim signal for each address in the ADDR state 615, and may write to or read from a corresponding memory cell based on the corresponding address in accordance with the received trim signal.

The serial interface logic 122 may maintain the ADDR state 615 until all the trim signals for 16 addresses are received through the trim terminal. When all the trim signals for 16 addresses are received through the trim terminal, the serial interface logic 122 may transition to an RD/PGM STOP state 617. The RD/PGM STOP state 617 may be a state in which the serial interface logic 122 receives a read mode end signal RDSP or a write mode end signal PGMSP through the trim terminal. Here, when the serial interface logic 122 continuously recognizes the low-level signal and the high-level signal through the trim terminal, the serial interface logic 122 may recognize as having received the read mode end signal RDSP or the write mode end signal PGMSP. When the interface logic 122 receives the end signal through the trim terminal, the interface logic 122 may return to the initial condition state 611.

Figure 7A:
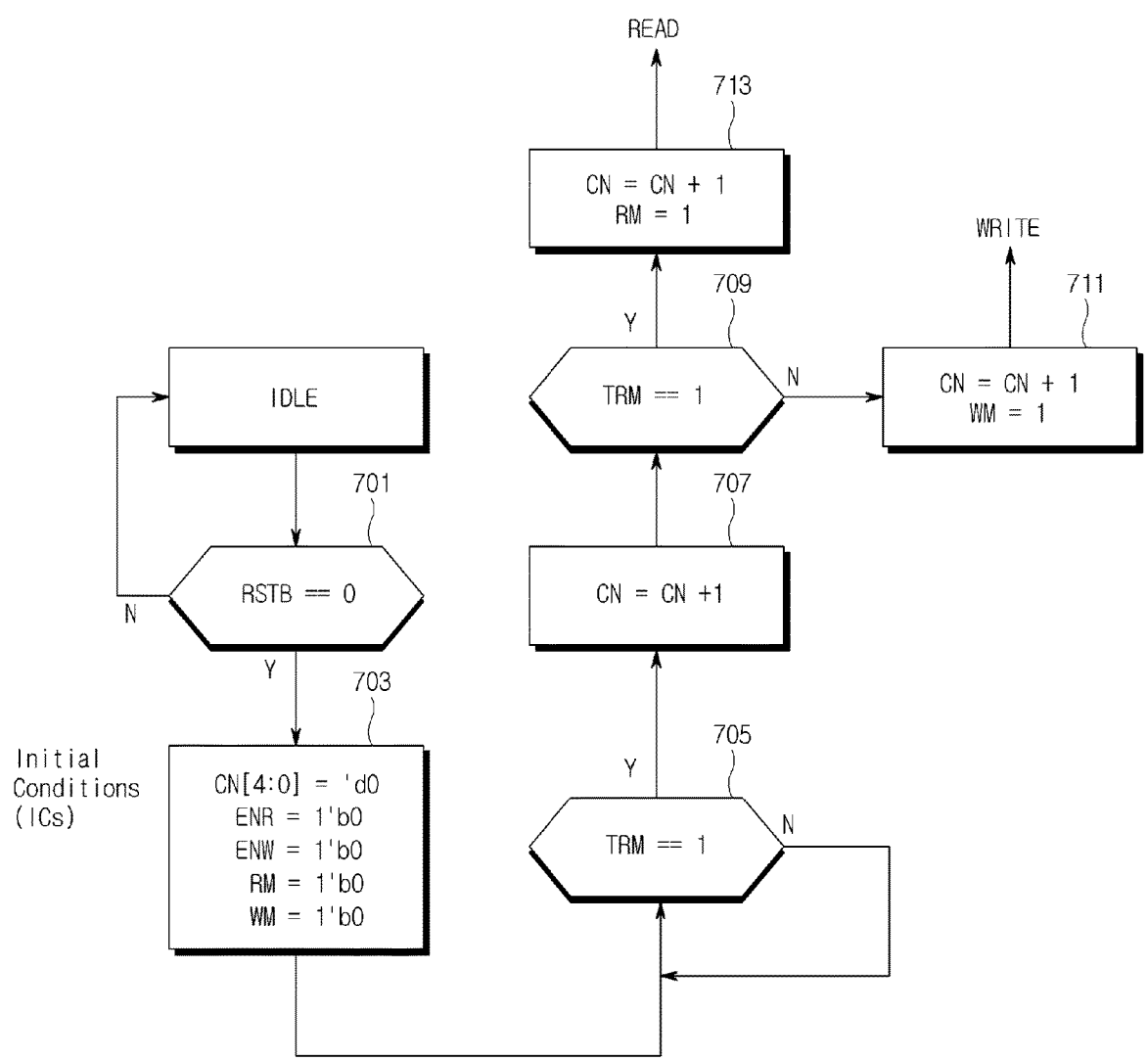
FIGS. 7A and 7B show internal operations of the serial interface logic according to one or more embodiments of the present disclosure.
Figure 7B:
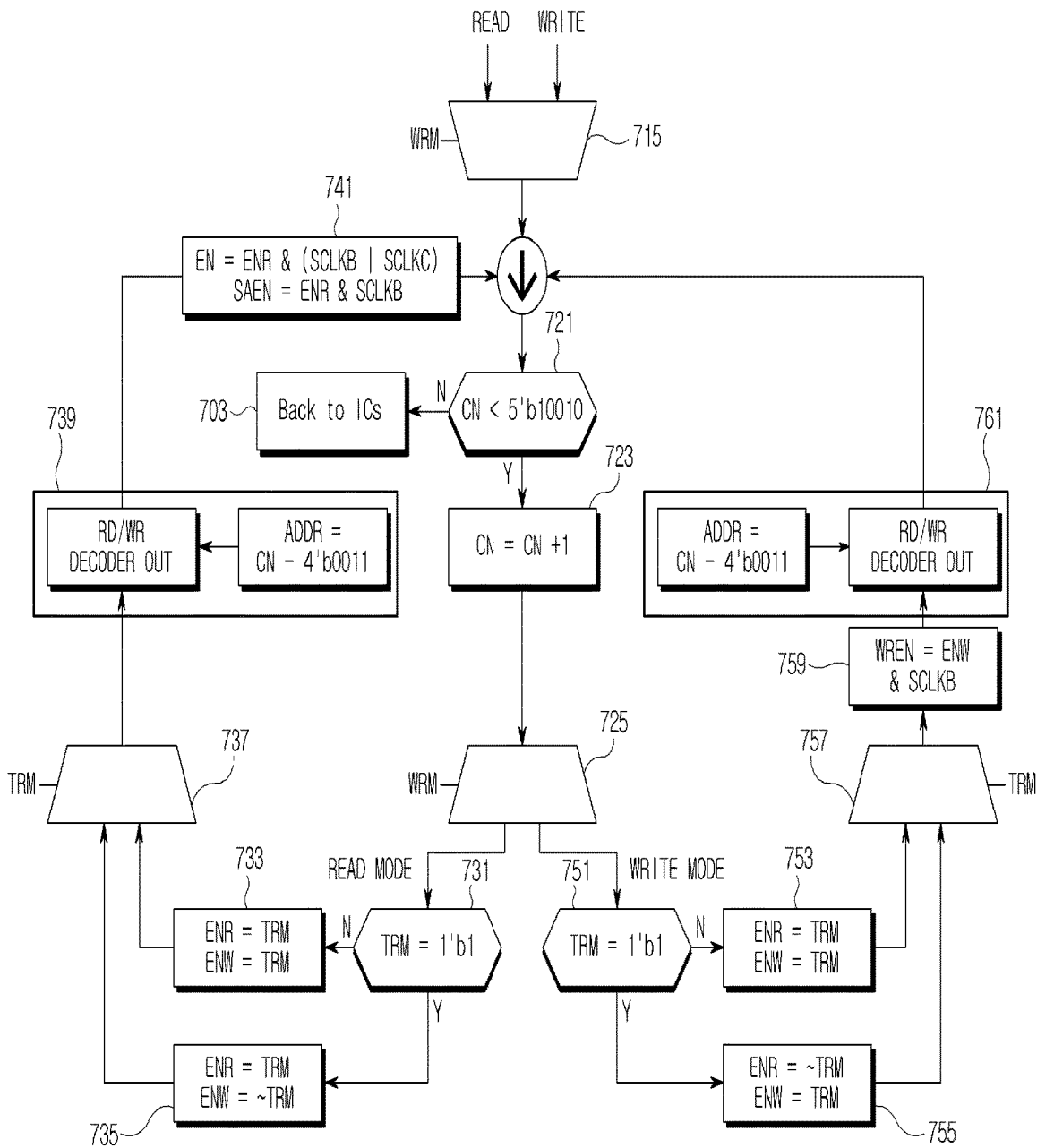

FIGS. 7A and 7B show internal operations of the serial interface logic according to one or more embodiments of the present disclosure.

Referring to FIGS. 7A and 7B, the serial interface logic 122 in the idle state IDLE may determine, in operation 701, whether a condition "RSTB==0" is satisfied. For example, the serial interface logic 122 may determine, in the idle state, whether the low-level signal RSTB is received.

When "RSTB==0" is satisfied, the serial interface logic 122 may perform an initial condition setting in operation 703. The initial condition setting may include setting internal parameters CN, ENR, ENW, RM, and WM to 0. For example, the serial interface logic 122 may set CN [4:0]='d0, ENR=1'b0, ENW=1'b0, RM=1'b0, and WM=1'b0. Here, CN may mean a count value for distinguishing the trim signal received through the trim terminal, and ENR may be a signal used internally to generate EN or SAEN in the read mode. ENW may be a signal used internally in the write mode, and RM and WM may be the read mode signal and the write mode signal, respectively, as described above.

When the initial condition setting is completed, the serial interface logic 122 may determine, in operation 705, whether a condition "TRM==1" is satisfied. For example, the serial interface logic 122 may determine whether a high-level start signal is received through the trim terminal.

When the condition "TRM==1" is satisfied, the serial interface logic 122 may determine that an event for reading or writing has occurred, and may set CN=CN+1 in operation 707. Accordingly, CN may be 1.

The serial interface logic 122 may determine whether the condition "TRM==1" is satisfied in operation 709. For example, the serial interface logic 122 may determine whether the operation mode of the eFuse_SI_IP 120 is the read mode or the write mode by recognizing the level of a signal TRM received through the trim terminal.

In operation 713, the serial interface logic 122 may determine CN=CN+1 and RM=1 when the condition "TRM==1" is satisfied in the state where CN is 1, that is, when the mode signal received through the trim terminal is at a high level that represents the read mode. Here, RM=1 may mean that the operation mode of the eFuse_SI_IP 120 is the read mode. Also, CN may be 2.

In operation 711, the serial interface logic 122 may determine CN=CN+1 and WM=1 when the condition "TRM==1" is not satisfied in the state where CN is 1, that is, when the mode signal received through the trim terminal is at a low level that represents the write mode. Here, WM=1 may mean that the operation mode of the eFuse_SI_IP 120 is the write mode. Also, CN may be 2.

Referring to FIG. 7B, the serial interface logic 122 may proceed to operation 721 by operation 715, regardless of whether RM=1 or WM=1. That is, in the state where RM=1 or WM=1, the serial interface logic 122 may determine whether a condition "CN<5'b10010", i.e., "CN is less than 18", is satisfied in operation 721. If the condition "CN<5'b10010" is not satisfied, the serial interface logic 122 may return to operation 703.

When the condition "CN<5'b10010" is satisfied, the serial interface logic 122 may set CN=CN+1 in operation 723. Here, CN may be greater than or equal to 3.

In operation 725, the serial interface logic 122 may determine whether a current mode is the read mode in which RM=1 or the write mode in which WM=1.

In the read mode in which RM=1, the serial interface logic 122 proceeds to operation 731 to determine whether "TRM=1'b1". That is, the serial interface logic may determine whether the trim signal received through the trim terminal is at a high level. When "TRM=1'b1", the serial interface logic 122 proceeds to operation 735 to set ENR=TRM and ENW=~TRM. Here, "~TRM" may be a signal obtained by inverting the signal TRM. For example, when the level of the trim signal for each address received through the trim terminal is a high level, the serial interface logic 122 may set ENR to 1 that is a high level, and set ENW to 0 that is a low level.

If "TRM=1'b1" is not satisfied, the serial interface logic 122 may proceed to operation 733 to set ENR=TRM and ENW=TRM. For example, when the level of the trim signal for each address received through the trim terminal is a low level, the serial interface logic 122 may set both ENR and ENW to 0 that is a low level.

In operation 737, the serial interface logic 122 may proceed to operation 739 regardless of whether "TRM=1'b1" is satisfied.

In operation 739, the serial interface logic 122 may set ADDR by using the value of CN, and output a signal representing the set ADDR to the eFuse IP 124 by using a RD/WR decoder. The signal representing the set ADDR may output a high level to a memory cell corresponding to the set ADDR among the plurality of memory cells of the eFuse IP 124 and output a low level to other memory cells. Here, the ADDR may be calculated by subtracting 4'b0011 from CN, and the RD/WR decoder may perform a one-hot encoding which sets only one bit corresponding to the ADDR among the signals RD [15:0] to a high level based on the ADDR value and sets the other bits to a low level.

In operation 741, the serial interface logic 122 may generate the signals EN and SAEN output to the eFuse IP 124. According to an embodiment, the signal EN may be set by EN=ENR & (SCLKB|SCLKC), and the signal SAEN may be set by SAEN=ENR & SCLKC. Here, "&" may mean an "AND" logic. Accordingly, when ENR is set to 1, which is a high level, each of the signals EN and SAEN may be output at a high level to the eFuse IP 124 in a time domain in which SCLKB and SCLKC are at a high level. The serial interface logic 122 may return to operation 721 after operation 741 to generate the above-described read signal to the next address.

In the write mode in which WM=1, the serial interface logic 122 proceeds to operation 751 to determine whether "TRM=1'b1". That is, the serial interface logic may determine whether the trim signal received through the trim terminal is at a high level. When "TRM=1'b1", the serial interface logic 122 proceeds to operation 755 to set ENR=~TRM and ENW=TRM. Here, "~TRM" may be a signal obtained by inverting the signal TRM. For example, when the level of the trim signal for each address received through the trim terminal is a high level, the serial interface logic 122 may set ENR to 0, which is a low level, and set ENW to 1, which is a high level.

If "TRM=1'b1" is not satisfied, the serial interface logic 122 may proceed to operation 753 to set ENR=TRM and ENW=TRM. For example, when the level of the trim signal for each address received through the trim terminal is a low level, the serial interface logic 122 may set both ENR and ENW to 0 that is a low level.

In operation 757, the serial interface logic 122 may proceed to operation 759 regardless of whether "TRM=1'b1" is satisfied.

In operation 759, the serial interface logic 122 may generate a signal WREN output to the eFuse IP 124. According to an embodiment, the signal WREN may be set by WREN=ENW & SCLKB. Here, "&" may mean an "AND" logic. Accordingly, when ENW is set to 1 at a high level, the signal ENW may be output at a high level to the eFuse IP 124 in a time domain in which SCLKB is at a high level. The serial interface logic 122 may proceed to operation 761 after operation 759.

In operation 761, the serial interface logic 122 may set ADDR by using the value of CN, and output a signal representing the set ADDR to the eFuse IP 124 by using a RD/WR decoder. The signal representing the set ADDR may output a high level to a memory cell corresponding to the set ADDR among the plurality of memory cells of the eFuse IP 124 and output a low level to other memory cells. Here, the ADDR may be calculated by subtracting 4'b0011 from CN. According to an embodiment, the RD/WR decoder in operation 761 may be the same as that in operation 739. The RD/WR decoder may perform the one-hot decoding which sets only one bit corresponding to the ADDR among the signals WD [15:0] to a high level based on the ADDR value and sets the other bits to a low level. The serial interface logic 122 may return to operation 721 after operation 761 to generate the above-described write signal to the next address.

Hereinafter, signals generated based on the reset signal RSTB, the trim signal, and the clock signal in the serial interface logic 122 will be described by taking examples with reference to FIGS. 8A and 8B.

Figure 8A:
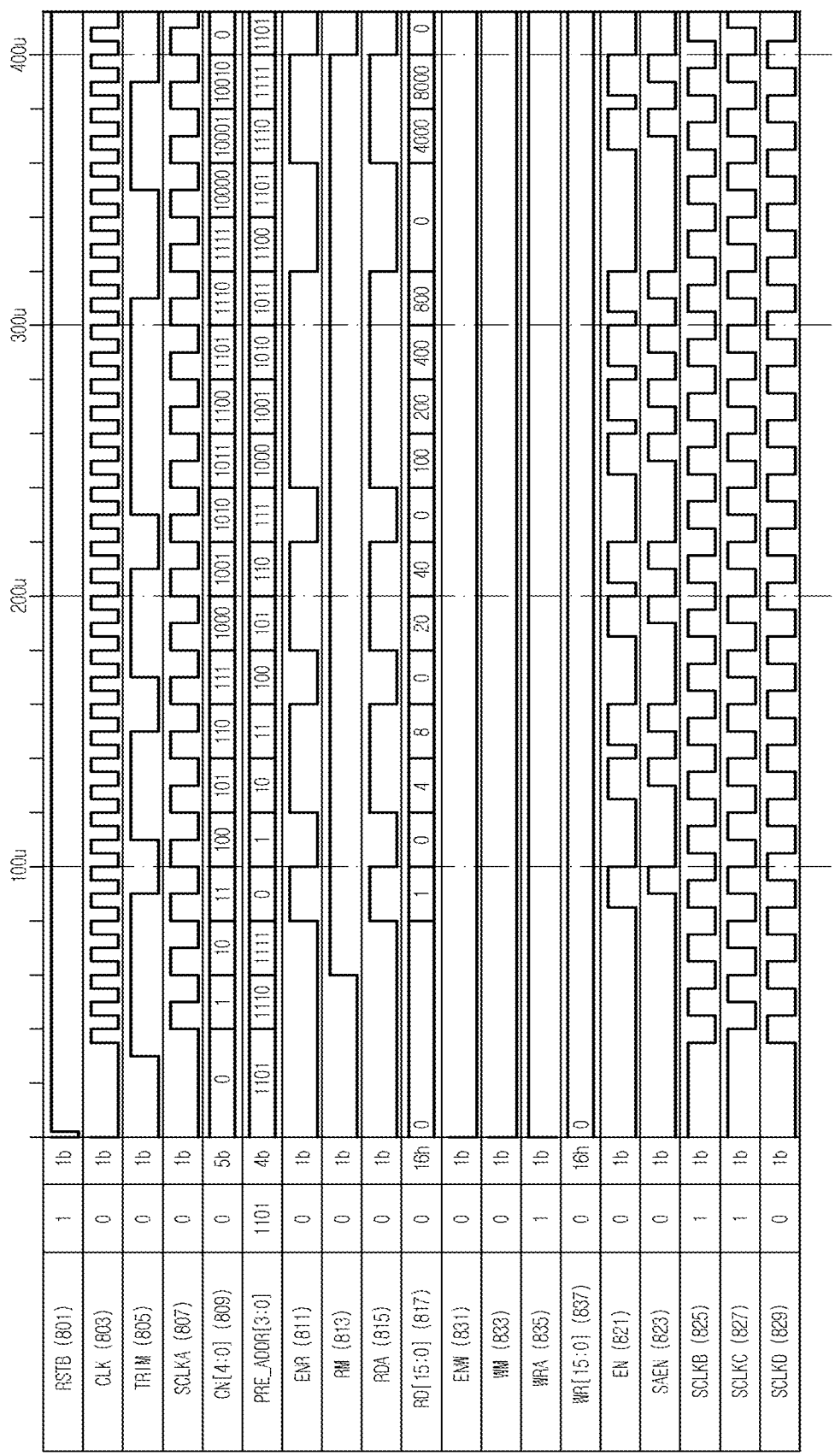
FIG. 8A is a timing diagram for a total signal for reading data of the eFuse OTP memory according to one or more embodiments of the present disclosure.

FIG. 8A is a timing diagram for a total signal for reading data of the eFuse OTP memory according to one or more embodiments of the present disclosure.

Referring to FIG. 8A, the serial interface logic 122 may generate a signal SCLKA 807 by dividing a clock signal 803 into two. The serial interface logic 122 may generate a signal SCLKB 825, a signal SCLKC 827, and a signal SCLKD 829 obtained by delaying the signal SCLKA 807 at different time intervals, and then may use them to generate an internal clock or a control signal.

The serial interface logic 122 may recognize whether a trim signal 805 is at a high level or a low level based on the generated signal SCLKA 807 and may perform the internal operation.

The serial interface logic 122 may transition to the initial condition state 611 when recognizing that a reset signal 801 is at a low level in the initial start state 601. Alternatively, after the trim signal shown in FIG. 3 is input to the trim terminal 213, and the read operation or the write operation is completed, the serial interface logic 122 may transition to the initial condition state 611. Then, the serial interface logic 122 may set the initial condition in accordance with operation 703 of FIG. 7. According to an embodiment, the serial interface logic 122 may initialize CN 809 to 5'b0 and may initialize ENR 811, RM 813, RDA 815, ENW 831, WM 833, and WRA 835 to 1'b0.

When the serial interface logic 122 recognizes that the received trim signal 805 is at a high level, the serial interface logic 122 increases the CN 809 by 1 in accordance with operation 707, and transitions from the initial condition state 611 to the WRD state 613. That is, in the WRD state 613, the CN 809 may have a value of 1.

The serial interface logic 122 may determine, according to the operation 709 in the WRD state 613, that is, in a state where the CN 809 is 1, whether the operation mode that should be performed based on the trim signal 805 recognized at the falling edge of the signal SCLKA 807 is the read mode or the write mode.

In an example of FIG. 8A, the serial interface logic 122 may recognize that the trim signal 805 is at a high level, may determine the operation mode as the read mode, may set the signal RM 813 to the high level (1'b1) in accordance with operation 713, and may increase the CN 809 by 1 and set the CN 809 to "5'b00010". The signal RM 813 becomes a high level at the rising edge of the signal SCLKA 807 and may maintain the high level until the read mode ends. Here, the serial interface logic 122 may transition from the WRD state 613 to the ADDR state 615.

The serial interface logic 122 determines, in the ADDR state 615, whether the CN 809 is less than "5'b10010" (decimal number 18) in accordance with operation 721. If the CN 809 is less than "5'b10010", the serial interface logic 122 may determine whether to read from an address generated based on the CN 809 based on the trim signal 805 received at the falling edge of the signal SCLKA 807. If the current CN 809 is "5'b00010", the CN 809 increases by 1 in accordance with operation 723 and then becomes "5'b00011". Also, according to operation 731, when the serial interface logic 122 recognizes that the trim signal 805 is at a high level, the serial interface logic 122 may set the ENR 811 to a high level 1'b1 and may set the ENW 831 to a low level 1'b0 in accordance with operation 735. Also, ADDR=CN-4'b0011 becomes 0 in accordance with operation 739, so that the serial interface logic 122 may determine that the reading from the ADDR [0] should be performed. Also, the RD/WR decoder of the serial interface logic 122 may set the signal RDA 815 to a high level based on the ADDR value set to 0 and the ENR 811 set to the high level, and may set the signal RD [15:0] 817 to "4'h0001" ("16'b0000000000000001") in order to represent that an address at which the read operation is to be performed is ADDR [0], and may output the signal RD [15:0] 817 to the eFuse IP 124. Also, in accordance with operation 741, the serial interface logic 122 may generate a signal EN 821 and a signal SAEN 823 and may output the generated signal EN 821 and signal SAEN 823 to the eFuse IP 124. The output time point of the signal RD [15:0] 817 may be determined by the rising edge of the SCLKA 807, the output time point of the signal EN 821 may be determined by the SCLKB 825, and the output time point of the signal SAEN 823 may be determined by the SCLKC 827.

As described above, after the serial interface logic 122 outputs the read control signal for the ADDR [0], the CN 809 is "5'b00011" while the serial interface logic 122 is still in the ADDR state 615. Therefore, the serial interface logic 122 may pass through operation 721 and may determine whether to read from the ADDR [1] based on the trim signal 805 received at the falling edge of the signal SCLKA 807. The serial interface logic 122 may increase the CN 809 by 1 in accordance with operation 723, may recognize that the trim signal 805 is at a low level in operation 731, and may set the ENR 811 and the ENW 831 all to a low level in accordance with operation 733. Also, in accordance with operation 739, the serial interface logic 122 may set the signal RDA 815 to a low level based on the ENR 811 set to a low level, and may set the signal RD [15:0] 817 to "4'h0000" and output to the eFuse IP 124. Also, the serial interface logic 122 may generate the signal EN 821 and the signal SAEN 823 and output to the eFuse IP 124 in accordance with operation 741. However, since the signal RDA 815, the signal EN 821, and the signal SAEN 823 are all at a low level, the eFuse IP 124 will not perform the read operation.

After the serial interface logic 122 repeatedly performs the above-described operations for n number of addresses (e.g., 16 addresses), the CN 809 becomes "5'b10010" and the serial interface logic 122 may perform operation 703 and transition to the initial condition state 611 in accordance with the condition in operation 721. Here, the serial interface logic 122 transitions from the ADDR state 615 to the RD/PGM STOP state 617. When the serial interface logic 122 receives the end signal (e.g., the end signal in which a high-level signal is input after a low-level signal) through the trim terminal 213 in the RD/PGM STOP state 617, the serial interface logic 122 may transition to the initial condition state 611.

The serial interface logic 122 may initialize all the internal parameters to a low level in the initial condition state 611, and may wait until the next high-level start signal 311 is received.

Figure 8B:
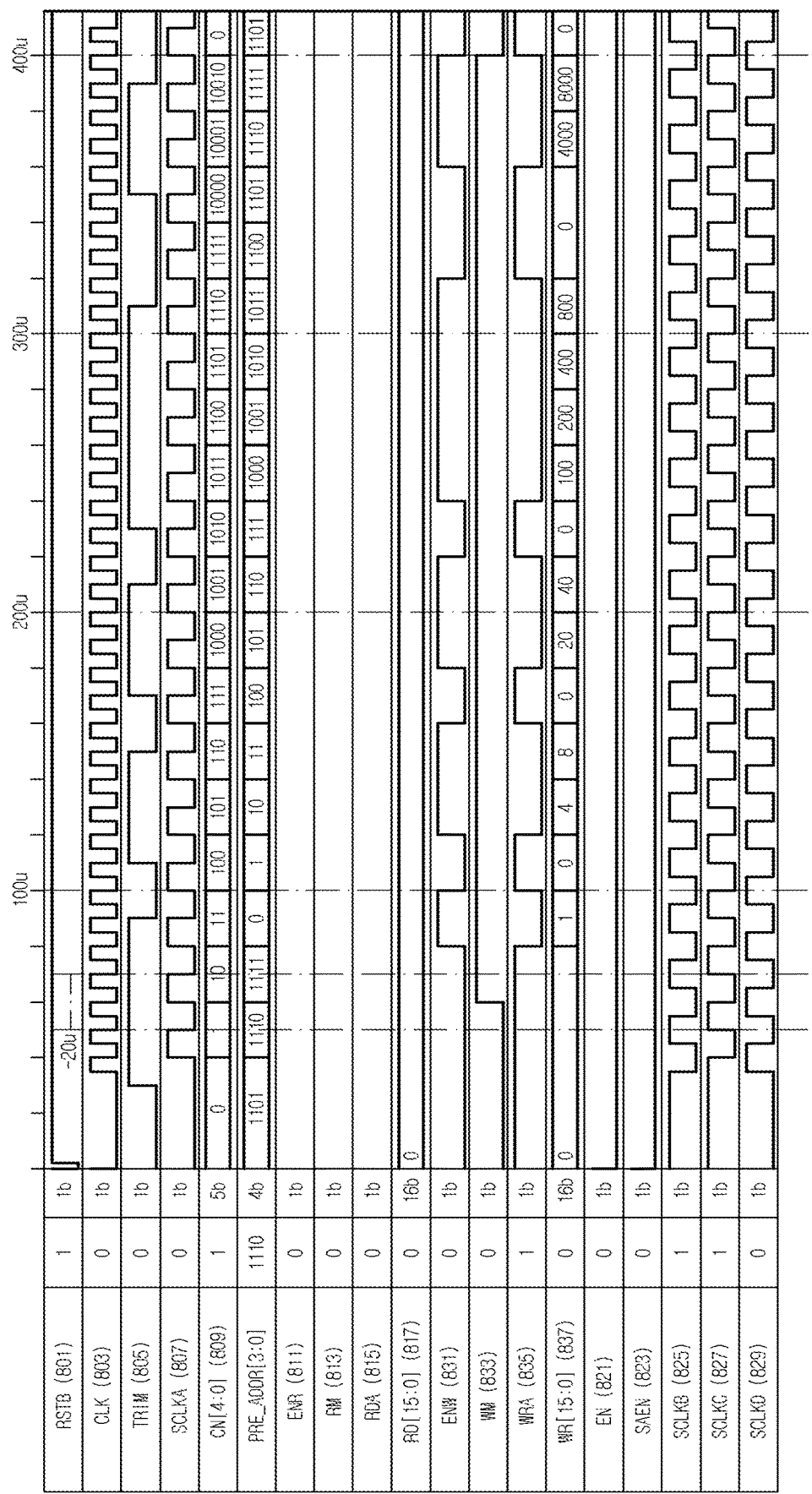
FIG. 8B is a timing diagram for a total signal for writing data to the eFuse OTP memory according to one or more embodiments of the present disclosure.

FIG. 8B is a timing diagram for a total signal for writing data to the eFuse OTP memory according to one or more embodiments of the present disclosure.

Referring to FIG. 8B, when the serial interface logic 122 recognizes that the reset signal 801 is at a low level in the initial start state 601, the serial interface logic 122 may transition to the initial condition state 611. Alternatively, after the trim signal shown in FIG. 3 is input to the trim terminal 213, and the read operation or the write operation is completed, the serial interface logic 122 may transition to the initial condition state 611. Then, the serial interface logic 122 may set the initial condition in accordance with operation 703 of FIG. 7. According to an embodiment, the serial interface logic 122 may initialize CN 809 to 5'b0 and may initialize ENR 811, RM 813, RDA 815, ENW 831, WM 833, and WRA 835 to 1'b0.

When the serial interface logic 122 recognizes that the received trim signal 805 is at a high level, the serial interface logic 122 increases the CN 809 by 1 in accordance with operation 707, and transitions from the initial condition state 611 to the WRD state 613. That is, in the WRD state 613, the CN 809 may have a value of 1.

The serial interface logic 122 may determine, according to the operation 709 in the WRD state 613, that is, in a state where the CN 809 is 1, whether the operation mode that should be performed based on the trim signal 805 recognized at the falling edge of the signal SCLKA 807 is the read mode or the write mode.

In an example of FIG. 8B, the serial interface logic 122 may recognize that the trim signal 805 is at a low level, may determine the operation mode as the write mode, may set the signal WM 833 to the high level (1'b1) in accordance with operation 711, and may increase the CN 809 by 1 and set the CN 809 to "5' b00010". The signal WM 833 becomes a high level at the rising edge of the signal SCLKA 807 and may maintain the high level until the write mode ends. Here, the serial interface logic 122 may transition from the WRD state 613 to the ADDR state 615.

The serial interface logic 122 determines, in the ADDR state 615, whether the CN 809 is less than "5'b10010" (decimal number 18) in accordance with operation 721. If the CN 809 is less than "5'b10010", the serial interface logic 122 may determine whether to write to an address generated based on the CN 809 based on the trim signal 805 received at the falling edge of the signal SCLKA 807. If the current CN 809 is "5'b00010", the CN 809 increases by 1 in accordance with operation 723 and then becomes "5'b00011". Also, according to operation 751, when the serial interface logic 122 recognizes that the trim signal 805 is at a high level, the serial interface logic 122 may set the ENW 831 to a high level 1'b1 and may set the ENR 811 to a low level 1'b0 in accordance with operation 755. Also, ADDR=CN-4'b0011 becomes 0 in accordance with operation 761, so that the serial interface logic 122 may determine that the write operation to the ADDR [0] should be performed. Also, the RD/WR decoder of the serial interface logic 122 may set the signal WRA 835 to a low level based on the ADDR value set to 0 and the ENW 831 set to the high level, and may set the signal WR [15:0] 837 to "4'h0001" ("16'b0000000000000001") in order to represent that an address at which the write operation is to be performed is ADDR [0], and may output the signal WR [15:0] 837 to the eFuse IP 124. The output time point of the signal WR [15:0] 837 may be determined by the SCLKA 807.

As described above, after the serial interface logic 122 outputs the write control signal for ADDR [0], the CN 809 is "5'b00011" while the serial interface logic 122 is still in the ADDR state 615. Therefore, the serial interface logic 122 may pass through operation 721 and may determine whether to write to the ADDR [1] based on the trim signal 805 received at the falling edge of the signal SCLKA 807. The serial interface logic 122 may increase the CN 809 by 1 in accordance with operation 723, may recognize that the trim signal 805 is at a low level in operation 731, and may set the ENR 811 and the ENW 831 all to a low level in accordance with operation 733. Also, in accordance with operation 761, the serial interface logic 122 may set the signal WRA 835 to a high level based on the ENW 831 set to a low level, and may set the signal WR [15:0] 837 to "4'h0000" and output to the eFuse IP 124. However, since the signal WRA 835 is at a high level, the eFuse IP 124 will not perform the write operation.

After the serial interface logic 122 repeatedly performs the above-described operations for n number of addresses (e.g., 16 addresses), the CN 809 becomes "5'b10010" and the serial interface logic 122 may perform operation 703 and transition to the initial condition state 611 in accordance with the condition in operation 721. Here, the serial interface logic 122 transitions from the ADDR state 615 to the RD/PGM STOP state 617. When the serial interface logic 122 receives the end signal (e.g., the end signal in which a high-level signal is input after a low-level signal) through the trim terminal 213 in the RD/PGM STOP state 617, the serial interface logic 122 may transition to the initial condition state 611.

The serial interface logic 122 may initialize all the internal parameters CN 809, ENR 811, RM 813, ENW 831, and WM 833 to a low level in the initial condition state 611, and may wait until the next high-level start signal 311 is received.

Figure 9A:
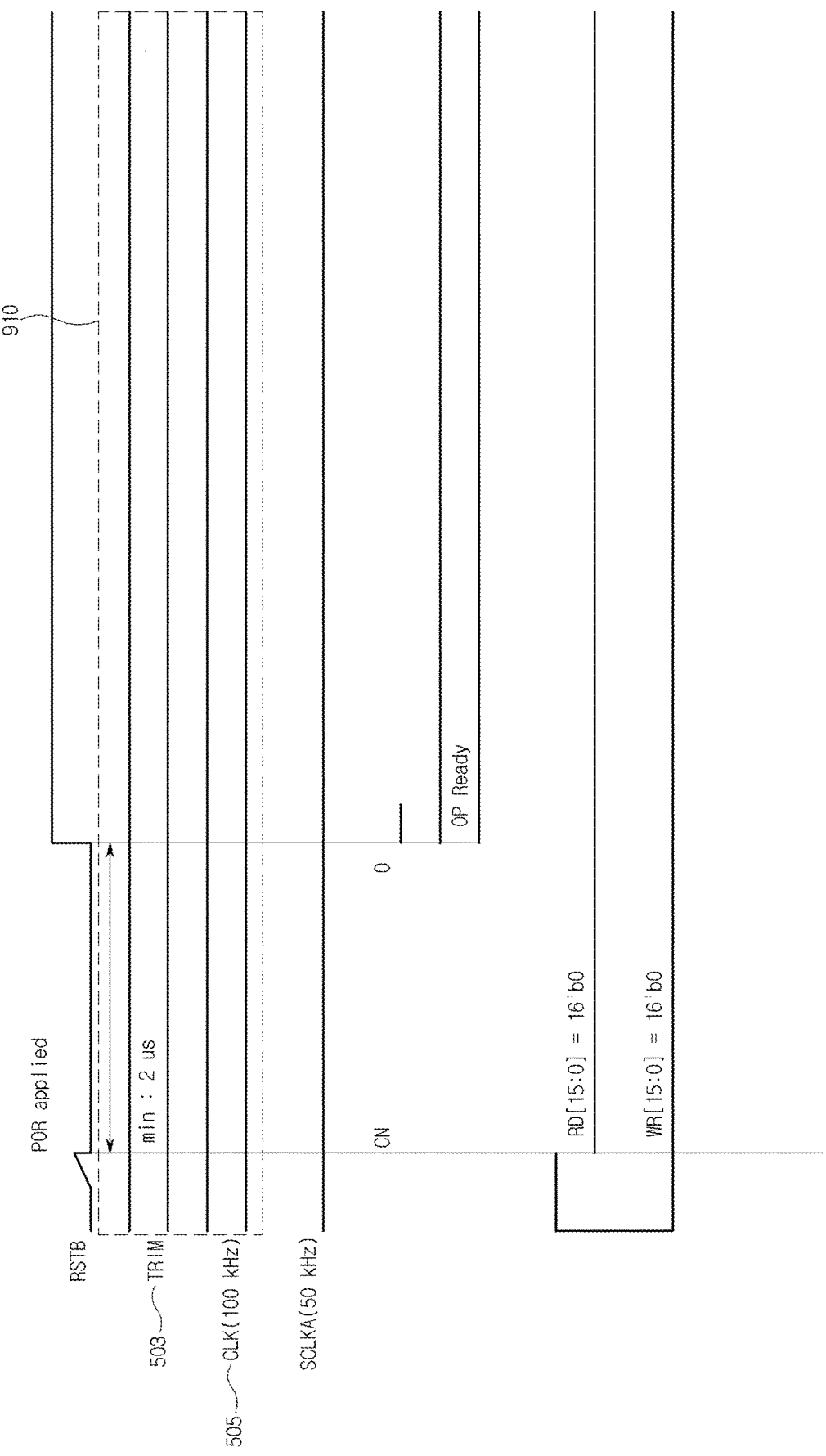
FIGS. 9A, 9B, and 9C show examples in which eFuse_SI_IP is in a standby mode in accordance with one or more embodiments of the present disclosure.
Figure 9B:
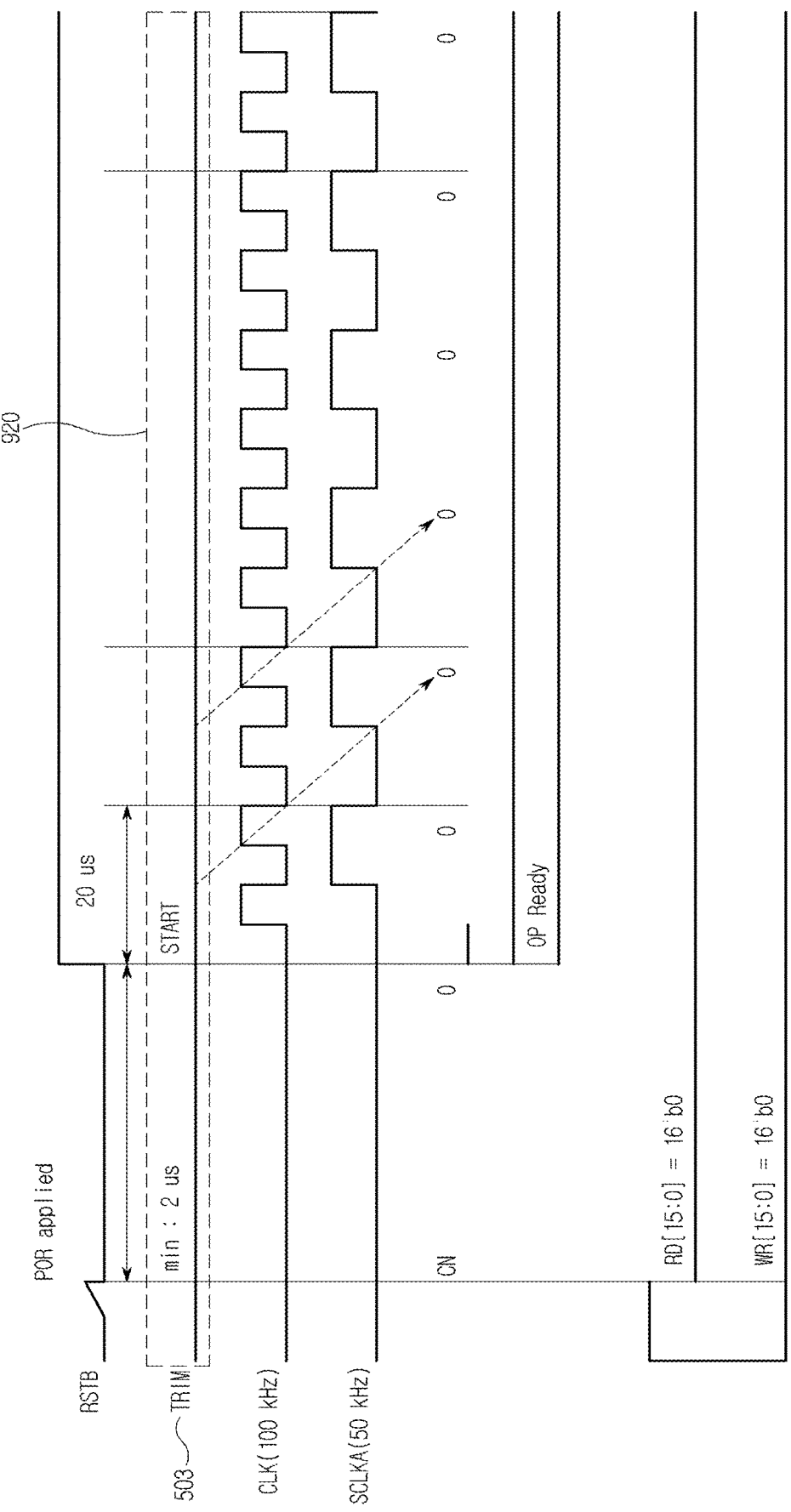
Figure 9C:
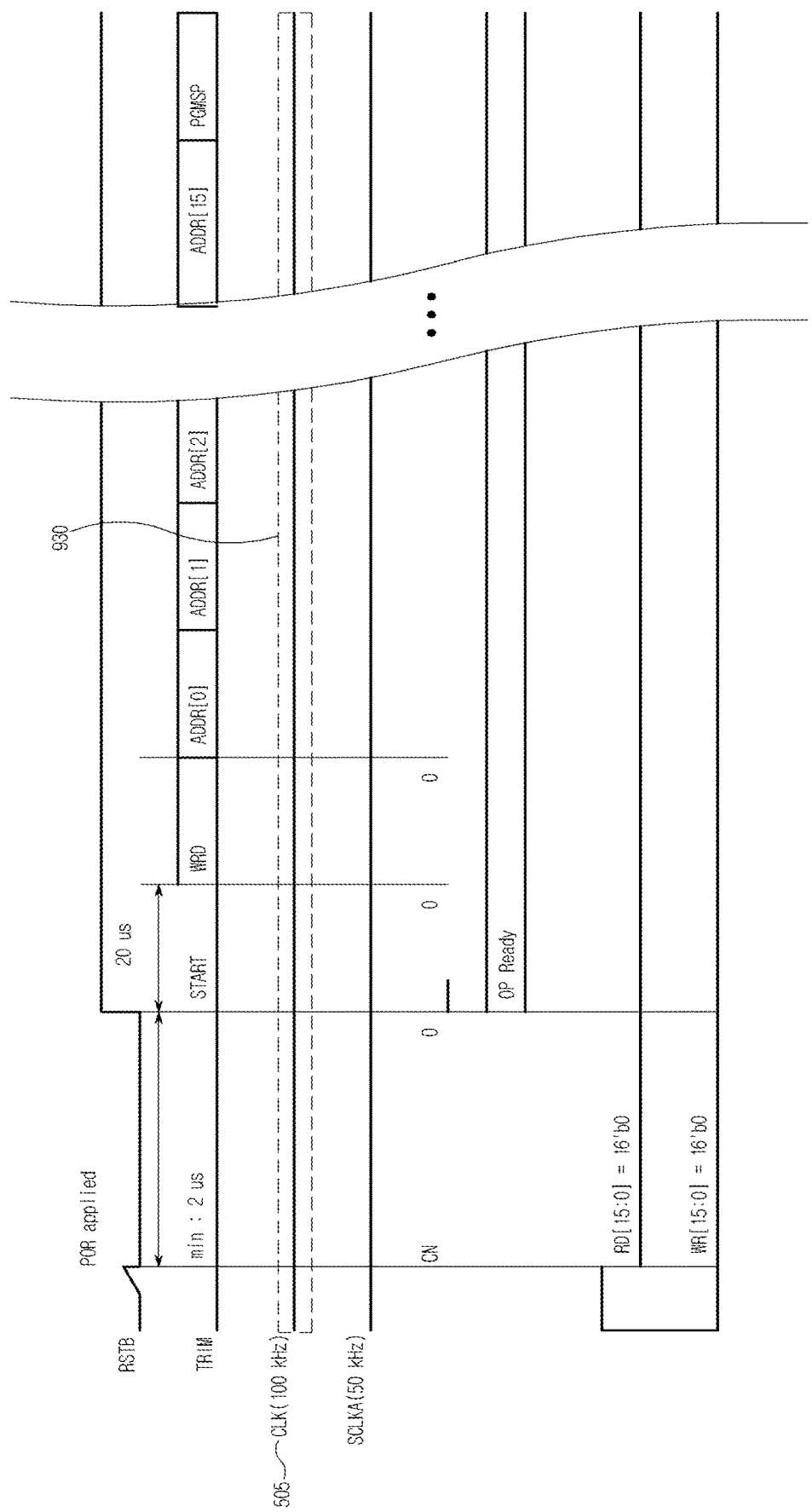

FIGS. 9A, 9B, and 9C show examples in which eFuse_SI_IP 120 is in a standby mode in accordance with one or more embodiments of the present disclosure. Here, the standby mode may mean a mode in which the read or write mode is not performed and stands by.

In one or more embodiments of the present disclosure, the serial interface logic 122 determines the operation mode of the eFuse_SI_IP 120 as the read mode or the write mode based on the trim signal and the clock signal and outputs the control signal to the eFuse IP 124 in accordance with the determined operation mode. Accordingly, if the clock signal 505 is, as shown in FIG. 9A or 9C, not input to the clock terminal 215 and only a continuous high-level signal or a continuous low-level signal is input (see 910 or 930), the eFuse_SI_IP 120 may not operate in the read mode or the write mode and may operate in the standby mode regardless of what the trim signal 503 is input to the trim terminal 213.

In another embodiment, as shown in FIG. 9B, even though the clock signal CLK is properly input through the clock terminal 215, if a high-level start signal is not input to the trim terminal 213 and only the continuous low-level trim signal 503 is input to the trim terminal 213 (see 920), the eFuse_SI_IP 120 may not operate in the read mode or the write mode and may operate in the standby mode. Here, if the trim signal 300 starting with the high-level start signal 311 shown in FIG. 3 is input to the trim terminal 215, the eFuse_SI_IP 120 may get out of the standby mode and operate in the read mode or the write mode.

Figure 10A:
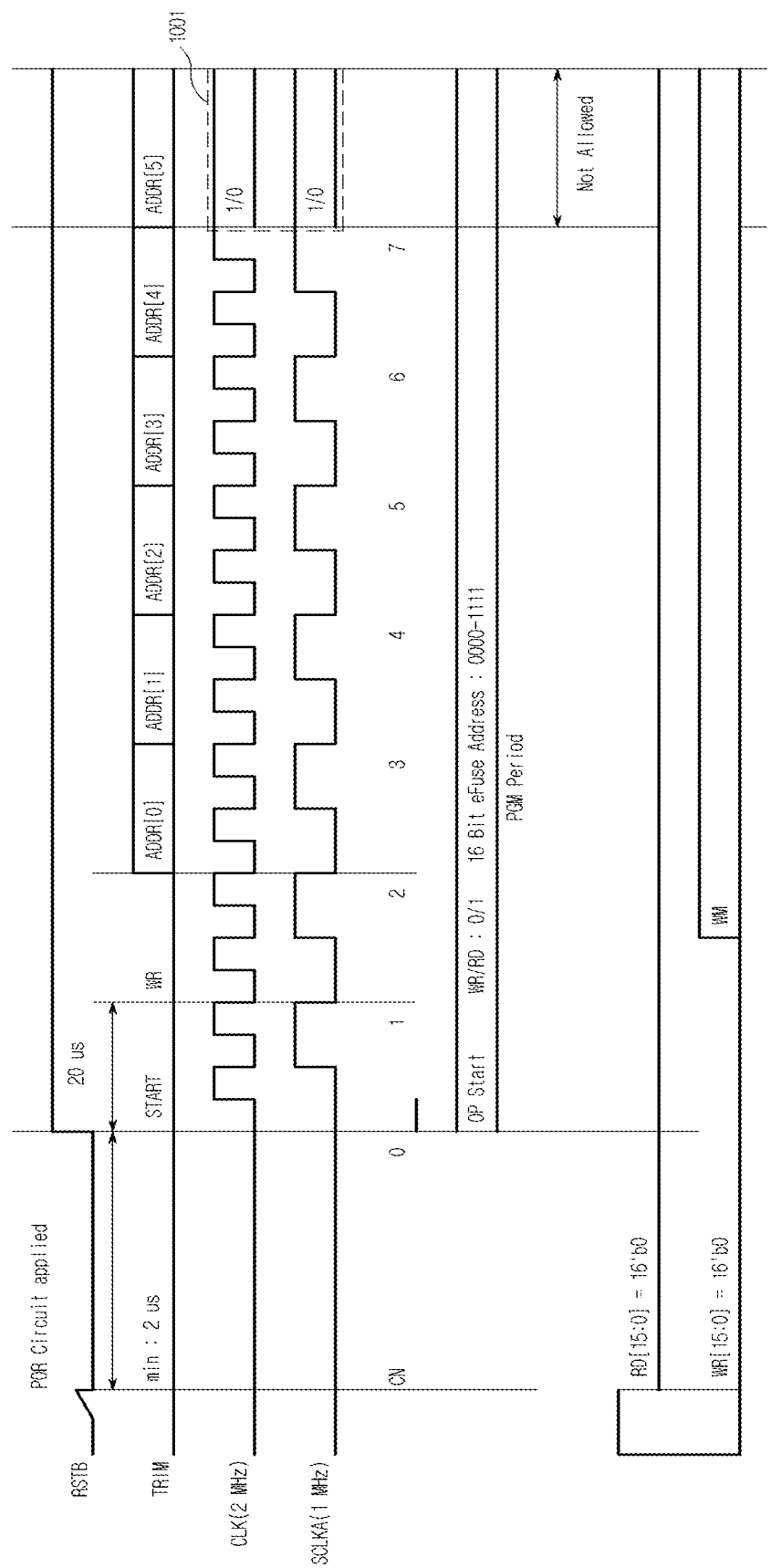
FIGS. 10A and 10B show a prohibition operation according to one or more embodiments of the present disclosure.
Figure 10B:
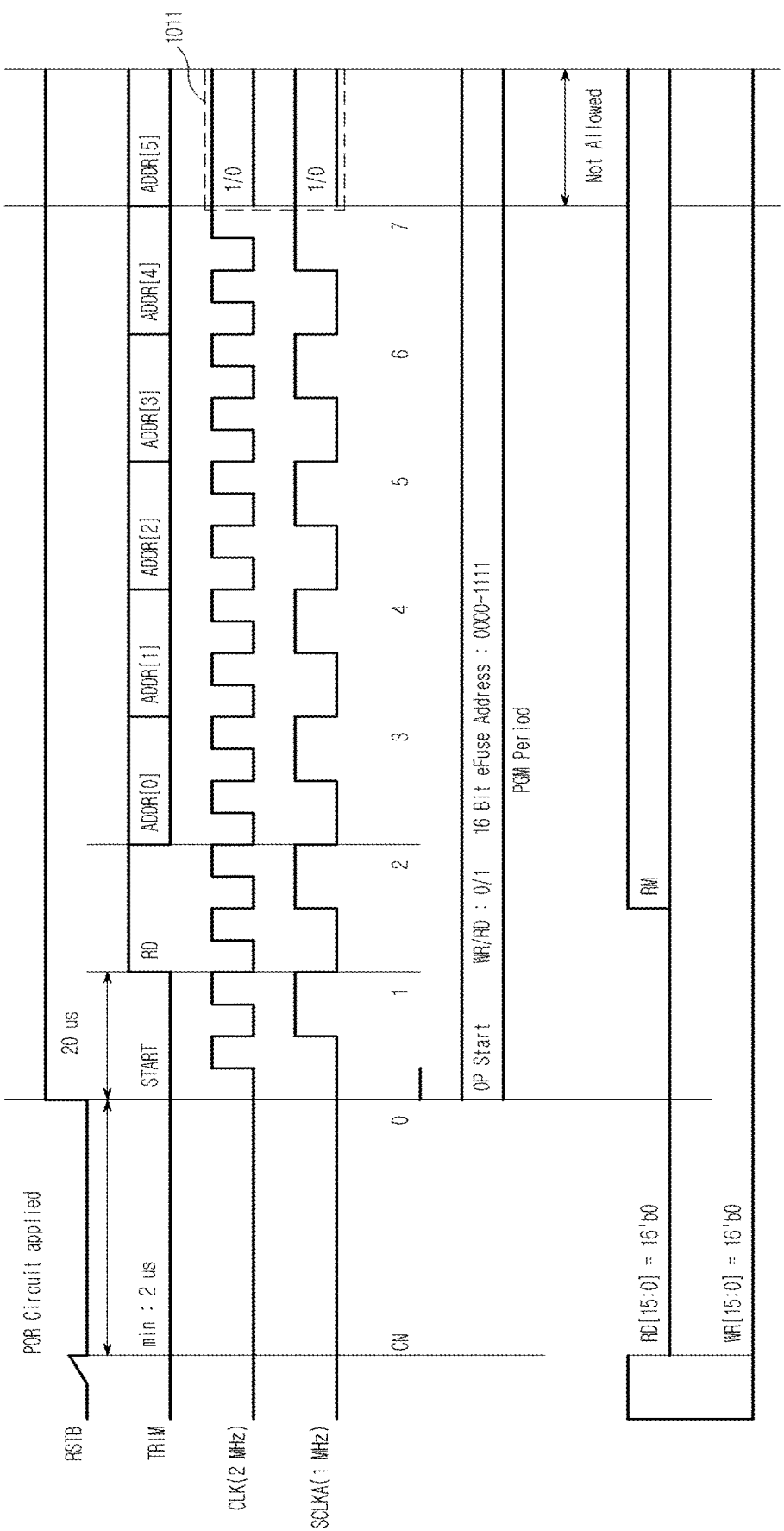

FIGS. 10A and 10B show a prohibition operation according to one or more embodiments of the present disclosure.

According to one or more embodiments of the present disclosure, in the system 100, including the eFuse OTP memory, in order to write data to an n-bit memory or read data from an n-bit memory, all the trim signals shown in FIG. 3 must be transmitted and received. For example, even though it may be desired to write only the memory cell at the first address among n memory cells and there is no need to perform the write operation to the other memory cells, trim signals for all the addresses must be transmitted and received. For instance, according to one or more embodiments of the present disclosure, as shown in FIG. 10A, it is not allowed to stop the write mode or the write operation by maintaining the clock signal at a low or high level (1001) during the write mode.

For another example, even though it may be desired to read only the memory cell at the first address among n memory cells and there is no need to perform the read operation from the other memory cells, trim signals for all the addresses must be transmitted and received. For instance, according to one or more embodiments of the present disclosure, as shown in FIG. 10B, it is not allowed to stop the read mode or the read operation by maintaining the clock signal at a low or high level (1011) during the read mode.

Figure 11:
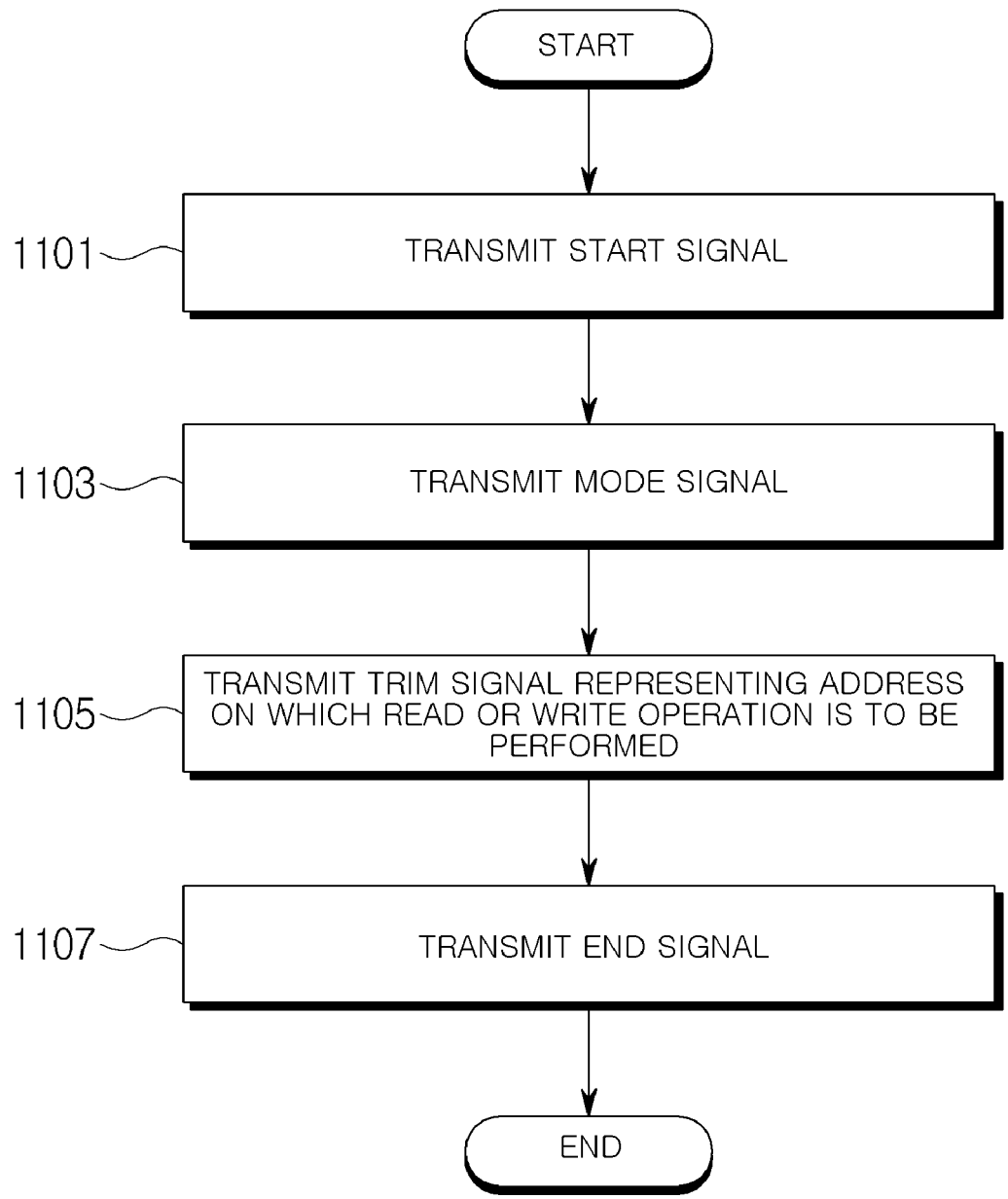
FIG. 11 is a flowchart of a master device according to one or more embodiments of the present disclosure.

FIG. 11 is a flowchart of a master device according to one or more embodiments of the present disclosure.

Referring to FIG. 11, the master device 110 may transmit the start signal START 311, representing that an event for reading or writing is generated to the eFuse_SI_IP 120 in operation 1101. For example, the master device 110 may transmit the high-level start signal 311, representing the start of the read mode or the write mode to the eFuse_SI_IP 120. According to an embodiment, the master device 100 may transmit the low-level reset signal RSTB to the eFuse_SI_IP 120 before transmitting the start signal 311. According to an embodiment, when transmitting the trim signal, the master device 100 may transmit the clock signal to the eFuse_SI_IP 120 together.

The master device 110 may transmit the mode signal 321 to the eFuse_SI_IP 120 in operation 1103. For example, the master device 110 may transmit the mode signal 321, representing whether a mode to be performed after transmitting the start signal 311 is the read mode or the write mode to the eFuse_SI_IP 120. When the master device 110 desires writing to the eFuse IP 124 of the eFuse_SI_IP 120, the master device 110 may transmit the low-level mode signal representing the write mode to the eFuse_SI_IP 120. When the master device 110 desires reading from the eFuse IP 124 of the eFuse_SI_IP 120, the master device 110 may transmit the high-level mode signal 321 representing the read mode to the eFuse_SI_IP 120.

In operation 1105, the master device 110 may transmit the trim signal representing an address at which the read or write operation is to be performed to the eFuse_SI_IP 120. For example, the master device 110 may determine at least one memory cell that requires reading or writing among the memory cells of the eFuse IP 124 included in the eFuse_SI_IP 120, and may transmit the trim signal representing an address of at least one memory that requires reading or writing to the eFuse_SI_IP 120. According to an embodiment, when n number of memory cells is provided in the eFuse IP 124, the master device 110 may transmit sequentially the trim signal representing whether to read or write for each address from the first address to the nth address. For example, the master device 110 may first transmit the trim signal ADDR [0] _TRM 331-1, representing whether to read or write for the first address, and then may transmit the trim signal ADDR [1] TRM representing whether the second address is read or written, and finally, may transmit the trim signal ADDR [n−1] _TRM representing whether to read or write for the n-th address.

According to an embodiment, in operation 1107, the master device 110 may transmit the trim signal 331, representing an address at which the read or write operation is to be performed to the eFuse_SI_IP 120, and then may transmit the end signal 341, representing the end of the write mode or the read mode to the eFuse_SI_IP 120. The end signal 341, representing the end of the write mode or the read mode, may be set in advance to transmit a high-level signal after a low-level signal.

Figure 12:
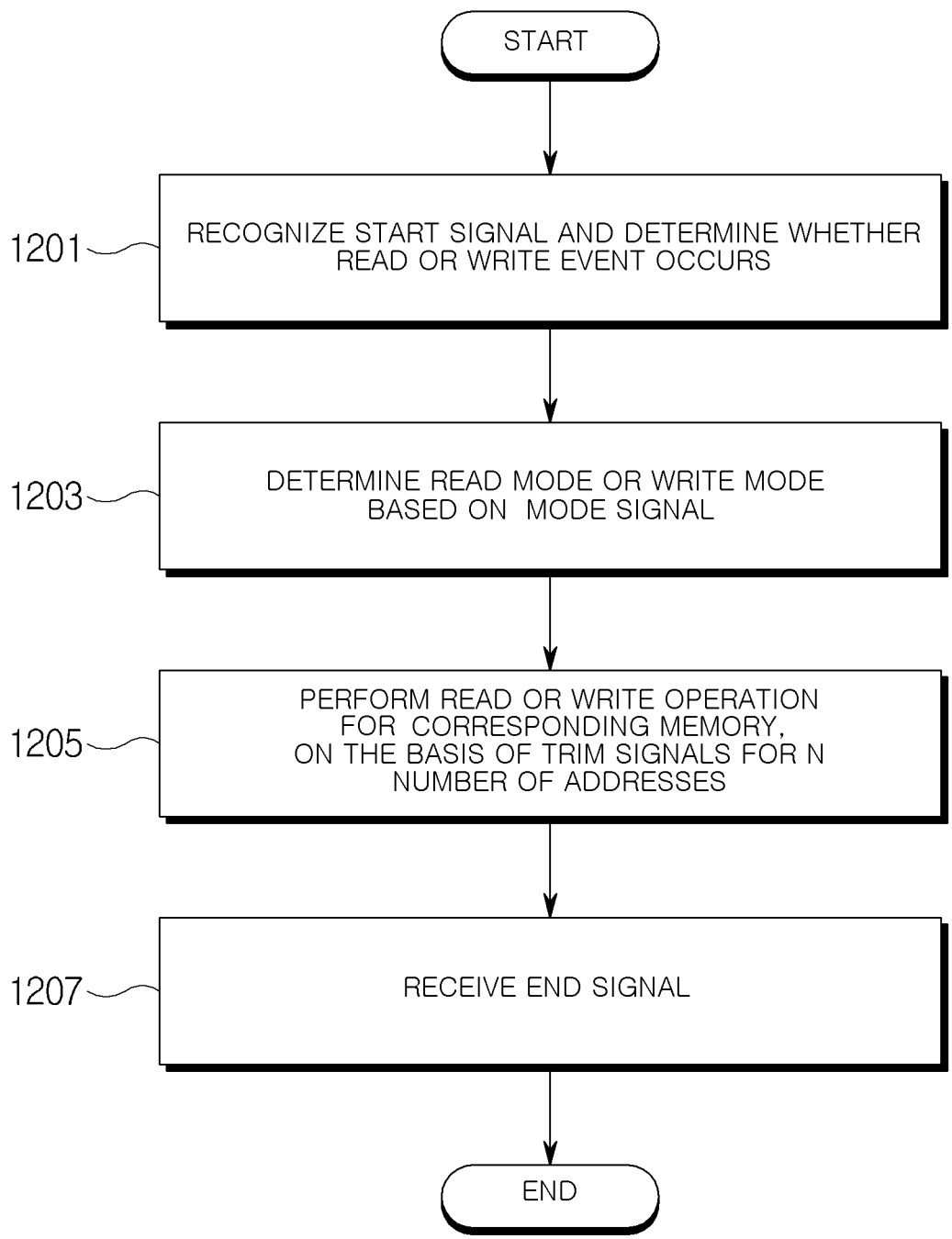
FIG. 12 is a flowchart of the eFuse_SI-IP according to one or more embodiments of the present disclosure.

FIG. 12 is a flowchart of the eFuse_SI-IP according to one or more embodiments of the present disclosure.

Referring to FIG. 12, in operation 1201, the eFuse_SI_IP 120 may recognize the start signal received from the master device 110 through the trim terminal 210 and may determine whether the read or write event occurs. For example, the eFuse_SI_IP 120 may analyze the level of the trim signal received through the trim terminal and may determine whether the read or write event occurs. When the high-level start signal is received, the eFuse_SI_IP 120 may determine that the read or write event has occurred. According to an embodiment, the eFuse_SI_IP 120 may receive the low-level reset signal before receiving the start signal. According to an embodiment, when receiving the trim signal, the eFuse_SI_IP 120 may receive the clock signal through the clock terminal 215. According to an embodiment, when a normal clock signal is not received through the clock terminal 215 (e.g., when a signal received through the clock terminal maintains a high level), the eFuse_SI_IP 120 may determine that the read or write event has not occurred, even though the high-level trim signal is received through the trim terminal.

In operation 1203, the eFuse_SI_IP 120 may determine the read mode or the write mode based on the mode signal 321 received through the trim terminal 213 after the start signal. For example, the eFuse_SI_IP 120 may receive a mode signal representing a mode to be performed through the trim terminal 213 from the master device 110, and may determine the operation mode of the eFuse_SI_IP 120 based on the level of the received mode signal. When the mode signal is at a high level, the eFuse_SI_IP 120 may determine the operation mode of the eFuse_SI_IP 120 as the read mode, and when the mode signal is at a low level, the eFuse_SI_IP 120 may determine the operation mode of the eFuse_SI_IP 120 as the write mode.

In operation 1205, the eFuse_SI_IP 120 may perform the read operation or the write operation for a corresponding memory based on the trim signals for n number of addresses. For example, the eFuse_SI_IP 120 may receive the trim signal representing whether to read or write for each of n addresses through the trim terminal 213, and may perform the read operation or write operation for the memory cell of each address based on the received trim signal. Here, each address may be matched one-to-one to a 1-bit memory cell.

According to an embodiment, in operation 1207, the eFuse_SI_IP 120 additionally may receive the trim signals for n addresses through the trim terminal 213 and then may receive the end signal 341 representing the end of the write mode or the read mode. When the eFuse_SI_IP 120 receives the end signal 341, representing the end of the write mode or the read mode, the eFuse_SI_IP 120 may end the event for the write mode or the read mode.

Figure 13:
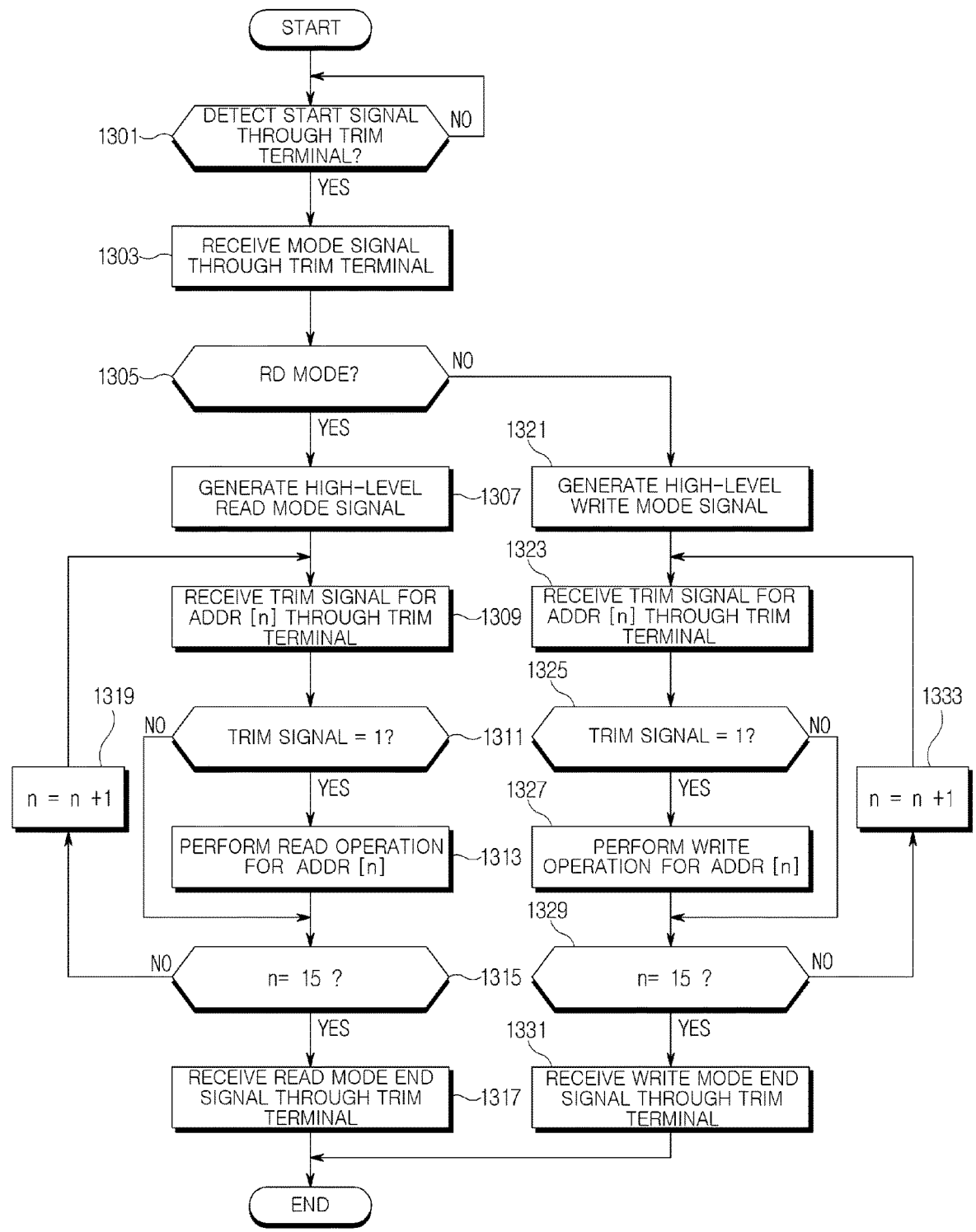
FIG. 13 is a flowchart showing that the read operation or the write operation is controlled based on the trim signal in the eFuse_SI_IP according to one or more embodiments of the present disclosure.

FIG. 13 is a flowchart showing that the read operation or the write operation is controlled based on the trim signal in the eFuse_SI_IP according to one or more embodiments of the present disclosure. In an embodiment of FIG. 13, respective operations may be sequentially performed, and may not be necessarily performed sequentially. For example, the order of the respective operations may be changed, and at least two operations may be performed in parallel.

Referring to FIG. 13, in operation 1301, the eFuse_SI_IP 120 may determine whether the start signal 311 is detected through the trim terminal. When the high-level start signal is detected through the trim terminal, the eFuse_SI_IP 120 may receive the mode signal 321 through the trim terminal in operation 1303. For example, the mode signal represents whether an operation to be performed is the read operation or the write operation. After the high-level start signal is received through the trim terminal, the mode signal may be received subsequent to the start signal.

In operation 1305, the eFuse_SI_IP 120 may determine whether the operation mode of the eFuse_SI_IP 120 is the read mode. For example, when the mode signal 321 is at a high level, the eFuse_SI_IP 120 may determine the operation mode of the eFuse_SI_IP 120 as the read mode, and when the mode signal is at a low level, the eFuse_SI_IP 120 may determine the operation mode of the eFuse_SI_IP 120 as the write mode.

In operation 1307, when the operation mode of the eFuse_SI_IP 120 is the read mode, the eFuse_SI_IP 120 may generate the high-level read mode (RM) signal. The read mode (RM) signal is used only within the serial interface logic 122 of the eFuse_SI_IP 120, and may not be provided to the eFuse IP 124.

In operation 1309, the eFuse_SI_IP 120 may receive the trim signal representing whether to perform the read operation from the ADDR [n] through the trim terminal. Here, "n" may start from 0. In operation 1311, the eFuse_SI_IP 120 may determine whether the trim signal for the ADDR [n] is 1, that is, is at a high level.

When it is determined that the trim signal for the ADDR [n] is at a high level in operation 1311, the eFuse_SI_IP 120 may perform the read operation for the ADDR [n] by using the one-hot encoding method in operation 1313. According to an embodiment, in order to perform the read operation for the ADDR [n], the serial interface logic 122 of the eFuse_SI_IP 120 may generate the signal RD (e.g., RD [15:0]) which represents the ADDR [n] that requires reading, the signal EN, and the signal SAEN, and may output them to the eFuse IP 124. Additionally, the serial interface logic 122 of the eFuse_SI_IP 120 may generate the signal RDA representing that the signal RD is valid, and may output the signal RDA to the eFuse IP 124. The signal RD representing the ADDR [n] that requires reading may be, for example, a signal composed of the n-th bit being 1 and the other bits being 0.

When it is determined that the trim signal for the ADDR [n] is at a low level in operation 1311, the eFuse_SI_IP 120 may determine that the read operation from the ADDR [n] is not necessary, and may proceed directly to operation 1315 without performing operation 1313.

In operation 1315, the eFuse_SI_IP 120 may determine whether "n" is 15. For example, the eFuse_SI_IP 120 may determine whether the trim signal for all the addresses of the 16-bit memory cell has been received and processed.

When "n" is not 15 (e.g., when "n" is less than 15), the eFuse_SI_IP 120 may set n=n+1 in operation 1319, may increase the value of n by 1, and then may return to operation 1309 to perform the subsequent operations again.

When "n" is 15, the eFuse_SI_IP 120 may determine that the trim signal for all the addresses of the 16-bit memory cell has been received and processed, and, may receive, in operation 1317, the RD mode end signal through the trim terminal. When the RD mode end signal is received, the eFuse_SI_IP 120 may end the RD mode and return to the initial state.

When the operation mode of the eFuse_SI_IP 120 is not the read mode, that is, when the operation mode of the eFuse_SI_IP 120 is the write mode, the eFuse_SI_IP 120 may generate the high-level write mode (WM) signal in operation 1321. The write mode (WM) signal is used within the serial interface logic 122 and is not provided to the eFuse IP 124.

In operation 1323, the eFuse_SI_IP 120 may receive the trim signal for the ADDR [n] through the trim terminal. For example, the eFuse_SI_IP 120 may receive the trim signal representing whether to write to the n-th address through the trim terminal. The initial value of "n" may be 0.

In operation 1325, the eFuse_SI_IP 120 may determine whether the trim signal for the ADDR [n] is 1, that is, is at a high level.

When it is determined that the trim signal for the ADDR [n] is at a high level in operation 1325, the eFuse_SI_IP 120 may perform the write operation for the ADDR [n] by using the one-hot encoding method in operation 1327. According to an embodiment, in order to perform the write operation for the ADDR [n], the serial interface logic 122 of the eFuse_SI_IP 120 may generate the signal WR (e.g., WR [15:0]), which represents the ADDR [n] that requires writing, and may output the signal WR to the eFuse IP 124. The signal WR representing the ADDR [n] that requires writing may be, for example, a signal composed of the n-th bit being 1 and the other bits being 0. Also, the serial interface logic 122 of the eFuse_SI_IP 120 may additionally generate the signal WRA representing whether the signal WR is valid, and may output the signal WRA to the eFuse IP 124.

When it is determined that the trim signal for the ADDR [n] is at a low level in operation 1325, the eFuse_SI_IP 120 may determine that the writing to the ADDR [n] is not necessary, and may proceed directly to operation 1329.

In operation 1329, the eFuse_SI_IP 120 may determine whether "n" is 15. For example, the eFuse_SI_IP 120 may determine whether the trim signal for all the addresses of the 16-bit memory cell has been received and processed.

When "n" is not 15 (e.g., when "n" is less than 15), the eFuse_SI_IP 120 may set n=n+1 in operation 1333, may increase the value of n by 1, and then may return to operation 1323 to perform the subsequent operations again.

When "n" is 15, the eFuse_SI_IP 120 may determine that the trim signal for all the addresses of the 16-bit memory cell has been received and processed, and, may receive, in operation 1331, the write mode end signal through the trim terminal. When the write mode end signal is received, the eFuse_SI_IP 120 may end the write mode and return to the initial state.

As described above, in one or more embodiments of the present disclosure, the eFuse_SI_IP 120 may write data to the eFuse IP 124 or read data of the eFuse IP 124, based on the signals input through two input terminals of the trim terminal and the clock terminal. Accordingly, the design complexity of a customer product can be minimized, and low power consumption and compact logic for a small intellectual property (IP) form factor can be made.

According to one or more embodiments of the present disclosure, in the OTP memory, including the serial interface logic, the read and write operations from and to the eFuse OTP memory can be performed based on signals input through two input terminals. Accordingly, the design complexity of a customer product can be minimized, and low power consumption and compact logic for a small intellectual property (IP) form factor can be made.

The system, eFuse one-time programmable memory, master device 110, eFuse_SI_IP 120, serial interface logic 122, eFuse IP 124, signal analyzer 201, and decoder 203 in FIGS. 1-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RW, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An eFuse one-time programmable (OTP) memory, comprising:
an eFuse intellectual property (IP) configured to perform one-time writing and readings for a plurality of memory cells; and
a serial interface (SI) logic configured to receive a clock signal and a trim signal from a master device, generate a main clock signal based on the clock signal, recognize the trim signal based on the main clock signal, and perform data writing to, or reading from, the eFuse IP based on the clock signal and the trim signal,
wherein the trim signal comprises a start signal, a mode signal configured for a write mode or a read mode, and control signals configured to read or write for each of a plurality of addresses corresponding to the plurality of memory cells,
wherein in the read mode, the serial interface logic is configured to determine whether to read from an n-th address based on a control signal for the n-th address among the control signals, and in response to the read from the n-th address being determined, output a signal for the n-th address to the eFuse IP, and
wherein the signal for the n-th address has an n-th bit being 1 and other bits being 0.

2. The eFuse OTP memory of claim 1, wherein the serial interface logic comprises:

a clock terminal configured to receive the clock signal from the master device; and
a trim terminal configured to receive the trim signal from the master device,
wherein the serial interface logic is further configured to:
determine the read or write event based on the start signal received through the trim terminal,
determine an operation mode of the eFuse OTP memory as the write mode or the read mode based on the mode signal through the trim terminal, and
perform a read operation or a write operation for each of the plurality of addresses by receiving, through the trim terminal, the control signals.

3. The eFuse OTP memory of claim 2, wherein, in response to the operation mode of the eFuse OTP memory being determined as the write mode, the serial interface logic is further configured to:
determine whether to write to an n-th address based on a control signal for the n-th address among the control signals,
in response to the write to the n-th address being determined, output a signal for the n-th address to the eFuse IP,
and wherein the signal for the n-th address has an n-th bit being 1 and other bits being 0.

4. The eFuse OTP memory of claim 2, wherein the serial interface logic further comprises a reset terminal configured to receive a reset signal from the master device, and
wherein the serial interface logic is further configured to receive a high-level start signal through the trim terminal after receiving a low-level reset signal through the reset terminal.

5. The eFuse OTP memory of claim 2, wherein the trim signal further comprises an end signal, and
wherein the serial interface logic is further configured to end the write mode or the read mode in response to the end signal being received through the trim terminal.

6. The eFuse OTP memory of claim 1, wherein the serial interface logic is further configured to generate a signal EN for enabling an output buffer of the eFuse IP, for the read from the n-th address, and a signal SAEN for enabling a sense amplifier of the eFuse IP,
wherein the signal EN is output to the eFuse IP based on a first sub-clock signal obtained by delaying the main clock signal for as long as a first delay time, and
wherein the signal SAEN is output to the eFuse IP based on a second sub-clock signal obtained by delaying the main clock signal for as long as a second delay time.

7. The eFuse OTP memory of claim 1, wherein another control signal of the control signals comprises a signal EN for controlling an output buffer of the eFuse IP during the read operation, or a signal SAEN for controlling a sense amplifier of the eFuse IP.

8. An operation method of an eFuse one-time programmable (OTP) memory comprising a serial interface (SI) logic and an eFuse intellectual property (IP), the method comprising:
receiving a clock signal from a master device through a clock terminal;
generating a main clock signal based on the received clock signal;
recognizing a trim signal based on the main clock signal;
detecting a read event or a write event based on a start signal of the trim signal;

determining an operation mode of the eFuse OTP memory as a write mode or a read mode based on a mode signal received from the master device through a trim terminal; and performing a read operation or a write operation at each of a plurality of addresses based on control signals, received through the trim terminal, representing whether to read or write at each of the plurality of addresses corresponding to a plurality of memory cells, wherein, in response to the operation mode of the eFuse OTP memory being determined as the read mode, the performing of the read operation for each of the plurality of addresses comprises:

receiving a control signal for an n-th address among the control signals;

determining whether to read for the n-th address based on the control signal for the n-th address; and outputting a signal for the n-th address to the eFuse IP in response to the read from the n-th address being determined, and wherein the signal for the n-th address has an n-th bit being 1 and other bits being 0.

9. The operation method of claim 8, wherein, in response to the operation mode of the eFuse OTP memory being determined as the write mode, the performing the write operation for each of the plurality of addresses comprises:

receiving a control signal for an n-th address among the control signals;

determining whether to write for the n-th address based on the control signal for the n-th address; and outputting a signal for the n-th address to the eFuse IP in response to the write to the n-th address being determined, and wherein the signal for the n-th address has an n-th bit being 1 and other bits being 0.

10. The operation method of claim 8, further comprising receiving a reset signal from the master device through a reset terminal, wherein the start signal is received after the low-level reset signal is received through the reset terminal.

11. The operation method of claim 8, further comprising ending the write mode or the read in response to an end signal from the master device being received through the trim terminal.

12. The operation method of claim 8, further comprising, in response to the read from the n-th address is-being determined, generating a signal EN for enabling an output buffer of the eFuse IP and a signal SAEN for enabling a sense amplifier of the eFuse IP, wherein the signal EN is output to the eFuse IP based on a first sub-clock signal obtained by delaying the main clock signal for as long as a first delay time, and wherein the signal SAEN is output to the eFuse IP based on a second sub-clock signal obtained by delaying the main clock signal for as long as a second delay time.

13. A system comprising an eFuse one-time programmable (OTP) memory, the system comprising:

a master device configured to output a clock signal and a trim signal through a serial interface communication; and the eFuse OTP memory configured to receive the clock signal and the trim signal from the master device through the serial interface communication, and perform data writing to, or reading from, an eFuse intellectual property (IP) based on the clock signal and the trim signal, and wherein the trim signal comprises a start signal, a mode signal configured for a write mode or a read mode, and control signals configured to read or write at each of a plurality of addresses corresponding to a plurality of memory cells comprised in the eFuse IP, and wherein the serial interface communication is configured to generate a main clock signal for a serial interface logic of the eFuse OTP memory based on the received clock signal from the master device, and recognize the trim signal based on the main clock signal, wherein in the read mode, the eFuse OTP memory is configured to determine whether to read from an n-th address based on a control signal for the n-th address among the control signals, and in response to the read from the n-th address being determined, output a signal for the n-th address to the eFuse IP, and wherein the signal for the n-th address has an n-th bit being 1 and other bits being 0.

14. The system of claim 13, wherein the eFuse OTP memory comprises:

a clock terminal configured to receive the clock signal from the master device; and a trim terminal configured to receive the trim signal from the master device, and wherein the eFuse OTP memory is further configured to detect a read event or a write event based on the start signal received from the master device through the trim terminal, determine an operation mode of the eFuse OTP memory as the write mode or the read mode by receiving the mode signal from the master device through the trim terminal, and perform a read operation or a write operation for each of the plurality of addresses by receiving the control signals to each of the plurality of addresses through the trim terminal.

15. The system of claim 14, wherein, in response to the operation mode of the eFuse OTP memory being determined as the write mode, the eFuse OTP memory is further configured to:

determine whether to write to an n-th address based on the control signal for the n-th address, in response to the write to the n-th address being determined, output a signal for the n-th address to the eFuse IP, and wherein the signal for the n-th address has an n-th bit being 1 and other bits being 0.

* * * * *